United States Patent [19]
Takemoto et al.

[11] Patent Number: 6,120,746
[45] Date of Patent: Sep. 19, 2000

[54] EXHAUST GAS CLEANING CATALYST COMPONENT, PROCESS OF PRODUCTION OF THE SAME AND PROCESS FOR PRODUCTION OF EXHAUST GAS CLEANING CATALYST MEMBER

[75] Inventors: Takashi Takemoto, Higashihiroshima; Makoto Kyogoku, Hiroshima; Yuki Koda, Hiroshima; Akihide Takami, Hiroshima; Satoshi Ichikawa, Hiroshima; Hideharu Iwakuni, Hiroshima; Masahiko Shigetsu, Higashihiroshima; Kazunari Komatsu, Mihara, all of Japan

[73] Assignee: Mazda Motor Corporation, Hiroshima-ken, Japan

[21] Appl. No.: 09/084,483

[22] Filed: May 26, 1998

Related U.S. Application Data

[63] Continuation of application No. 08/684,838, Jun. 28, 1996, abandoned, which is a continuation of application No. 08/310,798, Sep. 29, 1994, abandoned.

[30] Foreign Application Priority Data

Sep. 30, 1993 [JP] Japan ..................................... 5-244174
Sep. 1, 1994 [JP] Japan ..................................... 6-208476

[51] Int. Cl.$^7$ ........................................................ B01J 8/02
[52] U.S. Cl. ..................................... 423/213.5; 423/239.1
[58] Field of Search ............................. 423/213.2, 213.5, 423/239.1, 239.2

[56] References Cited

U.S. PATENT DOCUMENTS

| | | | |
|---|---|---|---|
| 4,442,223 | 4/1984 | Chester et al. | 502/68 |
| 4,675,308 | 6/1987 | Wan et al. | 502/304 |
| 4,749,671 | 6/1988 | Saito et al. | 502/64 |
| 5,164,350 | 11/1992 | Abe et al. | 502/66 |
| 5,336,655 | 8/1994 | Basini et al. | 502/252 |
| 5,413,976 | 5/1995 | Takami et al. | 423/213.5 |

FOREIGN PATENT DOCUMENTS

| | | |
|---|---|---|
| 4204421 | 8/1993 | Germany . |
| 4-243545 | 8/1992 | Japan . |

*Primary Examiner*—Tom Dunn
*Assistant Examiner*—Stuart L. Hendrickson
*Attorney, Agent, or Firm*—Morrison & Foerster, LLP

[57] ABSTRACT

The active temperature of an exhaust gas cleaning catalyst is shifted to a higher temperature side when $Al_2O_3$ and/or $CeO_2$ is used as a co-catalyst and/or when an oxidation number of Pt or Ir which is used as the noble active component is plus four.

40 Claims, 16 Drawing Sheets

(Rig Test)

EXHAUST GAS CLEANING CATALYST COMPONENT, PROCESS OF PRODUCTION OF THE SAME AND PROCESS FOR PRODUCTION OF EXHAUST GAS CLEANING CATALYST MEMBER

This application is a continuation of Ser. No. 08/684,838, filed Jun. 28, 1996 which is a FWC of Ser. No. 08/310,798 filed on Sep. 29, 1994 both abandoned.

BACKGROUND OF THE INVENTION

1. Field of the Invention

The present invention relates to an exhaust gas cleaning catalyst component which decomposes NOx contained in an exhaust gas in the presence of a reducing agent such a hydrocarbon (HC) in an atmosphere comprising excess oxygen, a process for the production of the same and a process for the production of an exhaust gas cleaning catalyst member, especially a honeycomb member comprising such a catalyst component.

2. Description of the Related Art

A three way catalyst is known as an exhaust gas cleaning catalyst for an internal combustion engine of, for example, an automobile. The three way catalyst is able to clean a hydrocarbon(HC), carbon monoxide(CO) and NOx contained in the exhaust gas at around a stoichiometric air-fuel ratio. However, it is not suitable for cleaning of NOx of the exhaust gas from the engine operated at a high oxygen concentration, so called a lean burn engine.

To the contrary, a zeolite supporting Pt and Rh is known as a catalyst which cleans NOx of the exhaust gas from a lean burn mode under an exceed oxygen concentration (see Japanese Patent Kokai Publication No. 243545/1992).

The inventors have made intensive studies as to a catalyst comprising the metal containing silicate such as a zeolite described above which carries a noble metal active component (such as Pt), and already found that combination of Pt and Ir, and optionally further combined with Rh, improves activity and heat resistance of the catalyst.

However, the metal containing catalyst carrying the noble metal active component as described above shows a low temperature (for example below 250° C.) at which a NOx cleaning ratio is maximum (so called a peak temperature). Thus, when the catalyst is heated to a high temperature as in the case of an exhaust gas cleaning catalyst for an automobile, a predetermined NOx cleaning cannot be achieved.

SUMMARY OF THE INVENTION

It is, therefore, an object of the present invention to render an active temperature of a catalyst higher comprising a metal containing silicate which carries a noble metal active component.

It is further an object of the present invention to improve a NOx cleaning ratio, an SV (space velocity) property (namely, improvement of the NOx cleaning ratio at a higher space velocity) and heat resistance of such a catalyst.

The present inventors have studied as to an active temperature of a catalyst comprising a metal containing silicate which carries a noble metal active component such as Pt and Ir, and found that the active temperature is shifted to a higher temperature side when at least one of $Al_2O_3$ and $CeO_2$ is mixed with the metal containing silicate as a co-catalyst and/or when an oxidation number of Pt or Ir which is used as the noble active component is plus four.

DETAILED DESCRIPTION OF THE INVENTION

Figure 1:
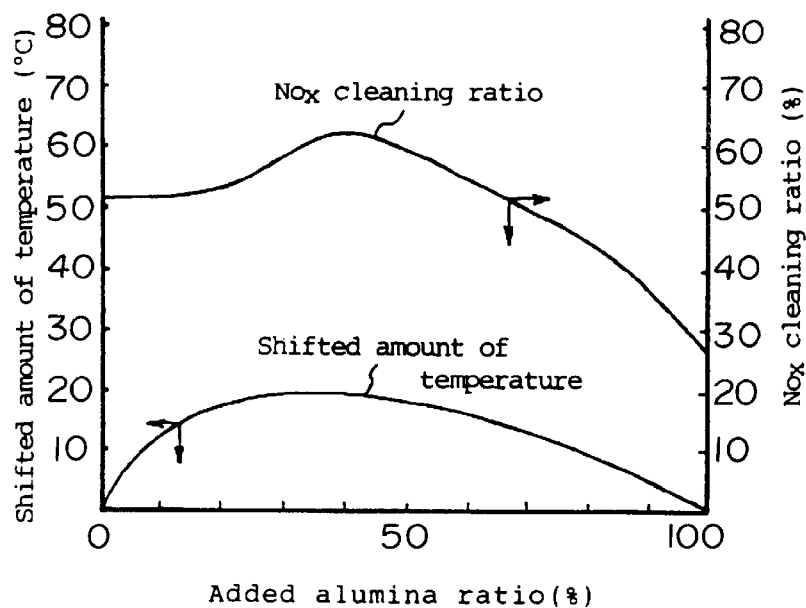
FIG. 1 is a graph which shows a relationship between an added alumina ratio through a pre-addition procedure and a shifted amount of temperature and a NOx cleaning ratio.

In the first aspect, the present invention provides a catalyst component for an exhaust gas cleaning comprising at least one metal containing silicate which carries at least one noble metal active component characterized in that at least one oxide of $Al_2O_3$ and $CeO_2$ is mixed with the silicate as a co-catalyst component.

The metal containing silicate means a crystalline porous material having micro pores of which typical example is an aluminosilicate (zeolite) containing Al as a metal element which constitutes a framework of a crystal. A metal containing silicate containing other metal element such as Ga, Ce, Mn, Tb and so on in place of or in addition to Al as a framework forming element may be used. As to the aluminosilicate, any type thereof may be used. For example, ZSM-5, ferrierite, mordenite, zeolite A, zeolite X and zeolite Y may be used. In addition, there is no specific limitation of an $SiO_2/Al_2O_3$ ratio.

As the noble metal active component, Pt, Rh, Ir or Pd which is said to have a lower temperature activity is preferable, and Pt is the most preferable from a view point of a low temperature activity of the catalyst component. In addition, any combination of the above noble metals may be also used. As described above, the combination of Pt and Ir or the combination of Pt, Ir and Rh is in particular preferable. Further, Pd may be combined therewith.

As $Al_2O_3$, one having a specific surface area of above 20 $m^2/g$ is preferable, and one having a specific surface area of about 200 $m^2/g$ or more is more preferable. In addition, γ-alumina is further more preferable.

In the catalyst according to the present invention, $Al_2O_3$ and $CeO_2$ contained as the co-catalyst components both functions to improve a NOx cleaning ratio and shift an active temperature of the catalyst component to a higher temperature side (referred to as a temperature shift or a temperature shifting effect) without no substantial degradation of a maximum NOx cleaning ratio of the catalyst component. Particularly, when the catalyst component is subjected to an aging treatment in which it is exposed to a high temperature, the temperature shifting effect becomes more remarkable and the SV property is also improved.

The reasons why such effects are obtained. It is contemplated as one reason that the noble metal active component, typically Pt, activates a reducing agent such as a hydrocarbon even at a relatively low temperature with its strong oxidation function so that NOx is cleaned at the low temperature, while $Al_2O_3$ or $CeO_2$ suppresses such an oxidation function of the noble metal active component, whereby an activate temperature range is shifted to the higher temperature side. In addition, why the temperature shifting effect becomes more remarkable with the aging treatment is that such a treatment makes some change in a state of the noble metal active component so that an interaction with $Al_2O_3$ or $CeO_2$ becomes more remarkable.

In this case, when the catalyst component is fresh (namely, which has not been subjected to the aging treatment), an overall catalyst activity of the component is mainly controlled by the metal containing silicate catalyst component which carries the noble metal active component. However, after the aging treatment, the temperature shift contributes to cleaning of the exhaust gas. In addition, $Al_2O_3$ and $CeO_2$ improves heat resistance of the noble metal active component.

In the catalyst component according to the first aspect, since at least one of $Al_2O_3$ and $CeO_2$ is mixed as the co-catalyst component, the active temperature is shifted to the higher temperature side without substantial degradation of the maximum NOx cleaning ratio, so that an overall NOx cleaning ratio of the catalyst component can be improved in a practical application of the catalyst component.

In a preferred embodiment, the catalyst according to the present invention comprises the metal containing silicate which carries Pt and Ir as the noble active components. This embodiment is advantageous to further improve the NOx cleaning ratio and the heat resistance of the catalyst component. It is contemplated that the activity of the catalyst component is improved since Ir functions to catch NOx so that contact of NOx with the hydrocarbon activated by Pt is accelerated. It is also contemplated that the heat resistance of the catalyst component is improved since Ir suppresses crystal growth of Pt at the high temperature.

In a further embodiment of the first aspect of the present invention, the catalyst component comprises $Al_2O_3$ and $CeO_2$ as the co-catalyst components and a weight ratio of such oxides ($Al_2O_3/CeO_2$) is in a range of 0.1 to 10.

In this embodiment, $Al_2O_3$ and $CeO_2$ are mixed, strong acid regions are distributed in a lattice form or in an insular form, which advantageously affects the temperature shifting effect and the improvement of the NOx cleaning ratio and the heat resistance of the catalyst components. In this case, an amount of the temperature shift provided by the thermal treatment of the catalyst component depends on the weight ratio of $Al_2O_3$ and $CeO_2$. When the weight ratio is out of the above specified range, the effect of mixing the both oxides is reduced.

In a further embodiment of the present catalyst, the oxide carries a noble metal active component. The noble metal active component is carried by $Al_2O_3$ or $CeO_2$ or both of $Al_2O_3$ and $CeO_2$ and an effect of $Al_2O_3$ and $CeO_2$ on the noble metal active component becomes remarkable, so that the temperature shifting effect can be enhanced.

Thus, the catalyst component comprising $Al_2O_3$ and $CeO_2$ which carries the noble metal active component is particularly effective to improve the catalyst component activity for the lean burn mode which produces the exhaust gas containing oxygen in a high concentration. This is derived from a co-operation effect of $Al_2O_3$ and $CeO_2$. A preferable weight ratio ($Al_2O_3/CeO_2$) is in a range of 0.1 to 10. When the ratio is out of the above specified range, the improvement of the catalyst activity is reduced. The weight ratio is more preferably is in a range of 0.5 to 4.

The catalyst comprising Pt and Ir as the active components is different from the three way catalyst comprising Pt and Rh as the active components. The difference from a mere mixture of the three way catalysts is that $Al_2O_3$ and $CeO_2$ are present for the improvement of the heat resistance of the active component which is useful for the NOx cleaning in the present catalyst. For the improvement of the three way catalyst, there has been addition of La or Ba in the prior art. Such improvement is provided by preventing $Al_2O_3$ and $CeO_2$ sintering with La or Ba since the active components are also sintered with sintering of $Al_2O_3$ and $CeO_2$. The present invention improves the heat resistance of the active component itself by $Al_2O_3$ and $CeO_2$, which is a completely different idea from the addition of Ba or La to the three way catalyst. However, in the present invention, the addition of La and Ba are useful for the further improvement of the heat resistance.

In a further embodiment of the present invention, the catalyst component comprises at least one of $Al_2O_3$ and $CeO_2$ as a first co-catalyst and at least one of transition metals except Cu and a noble metal (such as Ni, Mn, Co, Fe, Zr, Cr and Zn) as a second co-catalyst. The catalyst component is advantageous to suppress formation of $H_2S$. Thought $CeO_2$ provides the temperature shifting effect, it is likely to adsorb $SO_2$ contained in the exhaust gas during the lean burn mode with a high oxygen concentration. When the exhaust gas was changed to that formed by a rich burn mode with a low oxygen concentration, $SO_2$ reacts as an oxygen source with $H_2$ contained in the exhaust gas to leave the catalyst as $H_2S$ which causes smells. The transition metal such as Ni, Mn and Co suppresses the $SO_2$ adsorption function of $CeO_2$ so that the formation of $H_2S$ is prevented.

In a further embodiment of the present invention, the catalyst component comprises at least $CeO_2$ of $CeO_2$ and $Al_2O_3$ and an amount of the noble metal active component supported by the metal containing silicate is not more than 2 g/l-catalyst component. During the rich burn mode, the oxygen concentration of the exhaust gas is low and $H_2S$ is likely to be formed. This is because $SO_2$ adsorbed in the catalyst component acts as the oxygen source to be decomposed and desorbed. When a large amount of the noble metal active component is present, combustion of the hydrocarbon contained in the exhaust gas is accelerated, which causes a shortage of oxygen. Thereby, the decomposition and desorption of $SO_2$ is induced so that $H_2S$ is likely to be formed. To the contrary, in the catalyst component according to the present invention, since an amount of the noble metal active component is reduced to a low amount such as not more than 2 g/liter-catalyst component, the shortage of oxygen as described above is prevented so that such a catalyst is effective to prevent the formation of $H_2S$.

In a second aspect, the present invention provide a process for the production of an exhaust gas cleaning catalyst component characterized in that at least one metal containing silicate and at least one oxide of $Al_2O_3$ and $CeO_2$ are mixed to have a mixture and then at least one noble metal active component is supported by the mixture.

The above process is for the production of the catalyst of the first aspect. Thus, any reference in the first aspect is applicable to the process when it is proper. For example, the references to the metal containing silicate and the noble metal active component in the first aspect are also applicable to the process of the second aspect. These are also applicable to processes and a catalyst component according to the present invention which will be described below.

In the process, the noble metal active component is supported by not only the metal containing silicate but also $Al_2O_3$ and $CeO_2$, so that $Al_2O_3$ and $CeO_2$ highly affect the noble metal active component to obtain the catalyst component having the higher active temperature.

When the noble metal active component is supported by the mixture, any suitable manner can be employed such as a impregnation method, an ion exchange method, an evaporation to dryness method and a spray drying method. These methods can be employed also in the processed which will be described below.

In the third aspect, the present invention provide a process for the production of an exhaust gas cleaning catalyst component characterized in that, after depositing at least one noble metal active component to at least one metal containing silicate, at least one of $Al_2O_3$ and $CeO_2$ is mixed with the silicate. In this process, since the noble metal active component is not directly supported by $Al_2O_3$ and $CeO_2$ but supported by the metal containing silicate, there is provided a NOx cleaning catalyst component is produced which has a remarkable interaction between the noble metal active component and the metal containing silicate. In addition, when the catalyst component is subjected to an aging treatment at, for example, about 700 to 800° C., the active temperature of the component is shifted to a higher temperature side.

In the fourth aspect, the present invention provide a process for the production of an exhaust gas cleaning catalyst component characterized in that at least one noble metal active component is supported by at least one metal containing silicate while at least one noble metal active component is supported by an oxide comprising $Al_2O_3$ and $CeO_2$, and then the metal containing silicate which carries the active component and the oxide which also carries the active component are mixed together. In this embodiment, since the noble metal active component is supported by the oxide itself beforehand, the interaction between the oxides ($Al_2O_3$ and $CeO_2$) and the active component is remarkably revealed to enhance the temperature shifting effect, and the hydrocarbon and carbon monoxide contained in the exhaust gas are effectively cleaned similarly to the three way catalyst, whereby the HC and CO cleaning ratios are improved. In addition, the noble metal active component is directly supported by the metal containing silicate so that the NOx cleaning ratio is also high.

In the fifth aspect, the present invention provide a process for the production of an exhaust gas cleaning catalyst component characterized in that at least one noble metal active component is supported by an oxide comprising $Al_2O_3$ and $CeO_2$, which is then mixed with at least one metal containing silicate to have a mixture and then at least one noble metal active component is supported by the mixture. Also, in this embodiment, since the noble metal active component is directly supported by the oxide itself, the temperature shifting effect is achieved and the HC and the NOx cleaning ratios are improved. Since the active component is also supported by the metal containing silicate, the NOx cleaning ratio is also improved. Theses effects are, in principle, the same as those in fourth aspect just described above.

In one embodiment of any of the process according to the present invention, the oxide comprises $Al_2O_3$ and $CeO_2$ and a weight ratio of $Al_2O_3/CeO_2$ is in a range of 0.1 to 10. Such a weight ratio is advantageous for the production of the catalyst component having the improved heat resistance, temperature shifting effect and NOx cleaning ratio.

In the sixth aspect, the present invention provides a process for the production of a honeycomb catalyst member for exhaust gas cleaning characterized in that an exhaust gas cleaning catalyst component is produced by any of the above described processes of the present invention, the component is wash coated on a honeycomb support and then the support is subjected to an aging treatment at a temperature of 550 to 900° C.

The aging treatment enhances the interaction between the noble metal active component and $Al_2O_3$ or $CeO_2$ so that the temperature shifting effect is improved and the heat resistance of the catalyst component is also improved. In this process, when the aging treatment at a temperature below 550° C., a predetermined temperature shifting effect cannot be achieved. When the aging is carried out at a temperature above 900° C., the noble metal active component is degraded so that a predetermined NOx cleaning ratio is not achieved. That is, the process provides the catalyst member having the high temperature shifting effect with the prevention of the thermal degradation.

In the seventh aspect, the present invention provides a process for the production of a honeycomb catalyst member for exhaust gas cleaning characterized in that an exhaust gas cleaning catalyst component is produced by any of the above described processes of the present invention, the component is subjected to an aging treatment at a temperature of 550 to 850° C. and then the aged catalyst component is wash coated on a honeycomb support. In this embodiment, the aging treatment improves the temperature shifting effect and the heat resistance of the catalyst. Since the aging treatment is carried out before the wash coating step, the effect of the aging treatment is surely provided with all of the catalyst so that a uniform quality can be more readily and surely achieved than the aging treatment after the wash coating step, and thus productivity of the catalyst member is also improved. The aging temperature above 550° C. is suitable to achieve a predetermined effect thereof. Compared with the aging treatment step after the wash coating step, an upper limit of the aging temperature is so low as 850° C. This is because the active component is likely to be thermally degraded by the aging in the form of the powder.

In an eighth aspect, the present invention provides an exhaust gas cleaning catalyst component comprising at least one metal containing silicate which carries Pt and Ir characterized in that at least one of Pt and Ir of the metal containing silicate has an oxidation number of +4. Platinum (Pt) is stable when its oxidation number is +2 or +4, and iridium (Ir) is stable when its oxidation number is +3 or +4. In the present invention, $Pt^{+4}$ or $Ir^{+4}$ is used, so that the above temperature shifting effect is obtained. It is not why the effect is obtained. Not bound by any theory, oxidation of the HC and reduction of NOx is a redox reaction accompanying electron transfer, and +4 oxidation number would affect a temperature effect of the electron transfer so as to provide the temperature shifting effect (namely, the active temperature of the catalyst component is increased).

For the production of the catalyst component just described above, as a platinum (+4) compound, $PtCl_4$, $Na_2[PtCl_6]$, $K_2[PtCl_6]$, $K_2[Pt(OH)_6]$ and so on may be used, and as a iridium (+4) compound, $IrCl_4$, $Na_2[IrCl_6]$ and so on may be used.

EXAMPLES

The present invention will be, hereinafter, described with reference to the following Examples.

Example 1 (Alumina addition)

Alumina ($Al_2O_3$) was used as a co-catalyst. In this Example, two different procedure were employed for the addition of $Al_2O_3$: one is a pre-addition procedure in which $Al_2O_3$ is mixed with the metal containing silicate beforehand and then the noble metal active component is deposited, and the other is a post-addition procedure in which the noble metal active component is deposited on the metal containing silicate, and then $Al_2O_3$ is mixed with the silicate.

Alumina Pre-addition Procedure

ZSM-5 (H type) having an $SiO_2/Al_2O_3$ ratio of 70 as the metal containing silicate and γ-alumina having a specific surface area of about 200 $g/m^2$ (hereinafter, referred to as merely "alumina") as the $Al_2O_3$ was mixed in a weight ratio (ZSM-5: $Al_2O_3$) of 80:20 to obtain a mixture in the form of powder. Platinum (II) ammine crystal, Iridium trichloride and rhodium nitrate were so weighed that a metal weight ratio (Pt:Ir:Rh) is 30:6:1 and a total amount of the metals was 4.5 g/liter-catalyst. Platinum (II) ammine crystal and rhodium nitrate were dissolved in ion-exchanged water, and iridium trichloride was dispersed in propanol, and then both were mixed together. To this resulted mixture, powder mixture of H-type ZSM-5 and alumina was added and stirred for two hours. Then the mixture was spray dried instantaneously to produce a catalyst component powder.

The catalyst component powder was thermally treated (activation treatment) at a temperature of 200° C. for 14 hours in an air under an atmospheric pressure. Then, 20% by weight of a binder (hydrated alumina) and a water was added to the powder to prepare a slurry, which was wash coated on a honeycomb support (400 cells/inch$^2$) made of a cordierite. Then, the support was dried in an air at a temperature of 150°

C. for three hours and then calcined in air at a temperature of 500° C. for two hours to produce a honeycomb catalyst member. An amount of the catalyst component carried by the honeycomb support was 35 to 40% of a weight of the honeycomb member.

Another catalyst component powder was prepared by repeating the above pre-addition procedure except that an amount of the used alumina was 40% of a total weight of a mixture of alumina and H type ZSM-5. Then, another honeycomb catalyst member was produced.

Alumina Post-addition Procedure

Platinum (II) ammine crystal, Iridium trichloride and rhodium nitrate were weighed, and a liquid mixture comprising these components was prepared as in the above pre-addition procedure. ZSM-5 (H type) was added to the mixture, which was stirred for 2 hours at room temperature and then dried instantaneously with the spray drying method followed by the activation treatment to have a main catalyst component powder. To the powder, the same alumina as in the above was added in an amount of 20% based on a total weight to prepared a mixture powder. The resulted powder was wash coated on a honeycomb support made of a cordierite, which was dried and calcined to produce a honeycomb catalyst member. Conditions of the activation treatment, the wash coating, the drying and the calcination were the same as those in the pre-addition procedure.

In addition, another catalyst component powder was produced by repeating the above post-addition procedure except that an amount of the used alumina was 40% of a total weight of a mixture of alumina and H type ZSM-5. Then, another honeycomb catalyst member was produced.

With respect to each of the honeycomb catalyst member thus produced, a NOx cleaning ratio and a HC cleaning ratio were measured with a rig test. Also, it was tested with actual installation in an automobile by measuring the NOx cleaning ratio of an exhaust gas from an engine the automobile.

In the rig test, a maximum cleaning ratio was measured while the honeycomb catalyst member was set in an atmospheric fixed bed reactor and a simulated gas having an A/F ratio (air/fuel) of 22 was supplied to the reactor at a space velocity of 55000 hr$^{-1}$. In the actual automobile test, a total cleaning ratio was measured at a hot start mode. As to the honeycomb catalyst member, the following members were prepared: a fresh member which has not been thermally treated, an aged member which has been aging treated at a temperature of 700° C. for 25 hours, a thermally treated member at a temperature of 800° C. for 8 hours, and another thermally treated member at a temperature of 700° C. for 25 hours and then at a temperature of 800° C. for 8 hours. The results are shown in Tables 1 and 2 below with results of a Comparative Example member.

The Comparative Example member was the same honeycomb catalyst member as the Example member except that no alumina was added for the production of the catalyst component powder. The powder was prepared by the spray drying method as in the above Example member.

TABLE 1

| | | | | Rig Test | | | | | | | |
|---|---|---|---|---|---|---|---|---|---|---|---|
| | | | | Fresh | | 700° C. × 25 hr | | 800° C. × 8 hr | | 700° C. × 25 hr → 800° C. × 8 hr | |
| | Additive | Addition Procedure | Added Amount | Cleaning Ratio | Shifted Amount | Cleaning Ratio | Shifted Amount | Cleaning Ratio | Shifted Amount | Cleaning Ratio | Shifted Amount |
| Example 1 | Alumina | Pre | 20% | 53.5% | +21° C. | 47.8% | +12° C. | 42.4% | +12° C. | 35.8% | +4° C. |
| | | Pre | 40% | 65.6% | +16° C. | 59.6% | +15° C. | 48.5% | −1° C. | 35.3% | −5° C. |
| | | Post | 20% | 63.4% | 0° C. | 49.0% | +27° C. | 44.5% | +22° C. | 37.5% | +16° C. |
| | | Post | 40% | 54.1% | +5° C. | 47.3% | +33° C. | 37.5% | +29° C. | 34.5% | +15° C. |
| | Comparative Example | | | 53.3% | 235° C. | 52.5% | 250° C. | 48.3% | 266° C. | 38.0% | 270° C. |

Pre: Pre-addition procedure
Post: Post-addition procedure

TABLE 2

| | | | | Actual Automobile Test | | | |
|---|---|---|---|---|---|---|---|
| | | | Added | Fresh | | 700° C. × 25 hr | |
| | Additive | Addition Procedure | Amount (%) | HC Cleaning Ratio (%) | NOx Cleaning Ratio (%) | HC Cleaning Ratio (%) | NOx Cleaning Ratio (%) |
| Example 1 | Alumina | Pre | 20 | 95.0 | 23.3 | 89.0 | 28.8 |
| | | Pre | 40 | 96.0 | 23.2 | 88.9 | 28.8 |
| | | Post | 20 | 96.3 | 22.8 | 87.0 | 30.3 |
| | | Post | 40 | 96.2 | 23.5 | 86.0 | 31.9 |
| | Comparative Example | | | 96.7 | 19.8 | 87.0 | 23.8 |

Pre: Pre-addition procedure
Post: Post-addition procedure

Table 1 shows the NOx cleaning properties of the members in the rig test. The shifted amount in Table 1 means how a temperature of a gas supplied to the catalyst member at which the maximum NOx cleaning ratio was observed in the Example is shifted toward a higher temperature side from a temperature of a gas supplied to the catalyst member at which the maximum NOx cleaning ratio was observed in the Comparative Example. Each fresh Example member of the 40 wt % pre-addition procedure and 20 wt % post-addition procedure showed a higher NOx cleaning ratio than that of the Comparative member, which means that the addition of alumina improves the NOx cleaning ratio. Considering the shifted amount of the gas temperature at a catalyst inlet at which the maximum NOx cleaning ratio was observed (hereinafter, referred to as "maximum active temperature"), the maximum active temperature was relatively highly shifted (+16° C., +21° C.) from that of the Comparative Example (235° C.) with the pre-addition member. Even with the post-addition member, the temperature shift toward the higher temperature side was also observed with the 40 wt % addition. Those mean that the addition of alumina functions to shift the maximum active temperature of the catalyst member toward the higher temperature side.

As to the data of 700° C.×25 hrs., though the higher NOx cleaning ratio was observed in the pre-addition (40%) member, other ratios were less than those of the Comparative Example. However, the temperature shift of the maximum active temperature toward the higher temperature side was large in each of the pre-addition and the post-addition members. Particularly, the post-addition member showed the large shift (+27° C., +33° C.). Thus, it is seen that the temperature shifting effect is maintained after the catalyst has been exposed to a relatively higher temperature, and the post-addition procedure can shift the maximum active temperature highly toward the high temperature side by such an aging treatment.

As to the data of 800° C.×8 hrs. and the data of 700° C.×25 hrs. and 800° C.×8 hrs., in the Example, the NOx cleaning ratio of the Example was likely to be lower than the Comparative Example, but the maximum active temperature was likely to be shifted toward the higher temperature side from that of the Comparative Example. These results also show that the temperature shifting effect is maintained eve though the catalyst has been exposed to the high temperature.

Next, considering the results with the actual automobile test shown in Table 2, the HC cleaning ratios of the Example are not substantially different from those of the Comparative Examples. However, the NOx cleaning ratios were higher in Examples than in the Comparative Examples, which shows the shift of the maximum active temperature is effective for the improvement of the NOx cleaning ratio. As to the NOx cleaning ratio, the similar tendency was observed after the aging at a temperature of 700° C. for 25 hours.

Preferable Addition Amount Range in Alumina Pre-addition Procedure

With the rig test, a relationship was obtained between an added amount of alumina for the fresh member and the shifted amount of the maximum active temperature and the NOx cleaning ratio. For the preparation of the test member, the same procedures and conditions as described above were employed except that the added amount of alumina was changed. In the rig test, the simulated gas was used as described above, and the space velocity of the gas was 55000 hr$^{-1}$. The results are shown in FIG. 1.

It is seen from FIG. 1 that the added amount of alumina is to be not less than 5% by weight from view point of the temperature shift of at least some degrees of centigrade, and to be not larger than 80% by weight from view point of the prevention of degradation of the NOx cleaning ratio. It is also seen that the preferable amount range of the added alumina is within a range of 15 to 60% by weight.

Preferable Addition Amount Range in Alumina Post-addition Procedure

With the rig test, a relationship was obtained between an added amount of alumina and the shifted amount of the maximum active temperature and the NOx cleaning ratio with respect to the catalyst member of 700° C.×25 hrs. aging. For the preparation of the test member, the same procedures and conditions as described above were employed except that the added amount of alumina was changed. In the rig test, the simulated gas was used as described above, and the space velocity of the gas was 55000 hr$^{-1}$. The results are shown in FIG. 2.

Figure 2:
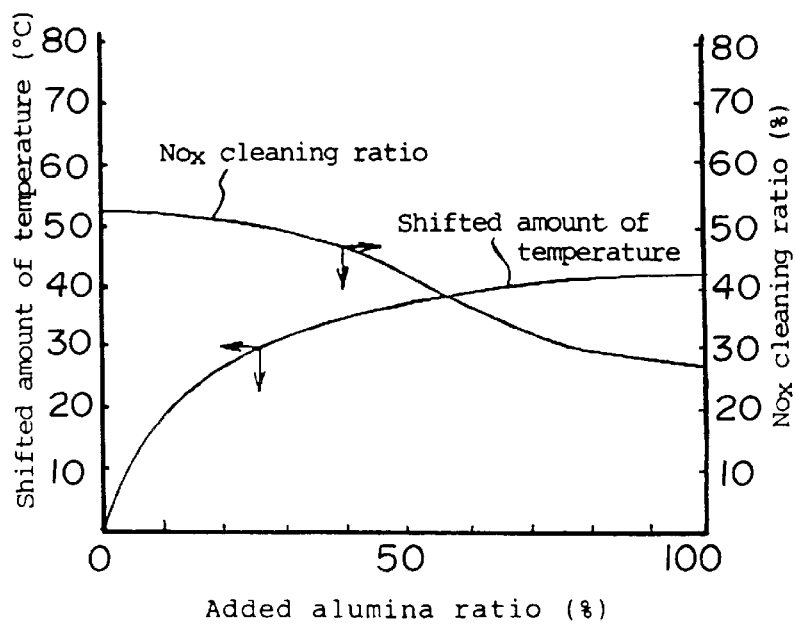
FIG. 2 is a graph which shows a relationship between an added alumina ratio through a post-addition procedure and a shifted amount of temperature and a NOx cleaning ratio.

It is seen from FIG. 2 that the added amount of alumina is to be not less than 5% by weight from view point of the temperature shift of at least some degrees of centigrade, and to be not larger than 70% by weight from view point of the prevention of degradation of the NOx cleaning ratio. It is also seen that the preferable amount range of the added alumina is within a range of 10 to 50% by weight.

Example 2 (Ceria addition)

Ceria ($CeO_2$) was used as a co-catalyst in Example 2. As in the case of $Al_2O_3$ (Example 1), there are two kinds of procedures for the production of the catalyst component: one is a pre-addition procedure and the other is a post-addition procedure.

Ceria Pre-addition Procedure and Ceria Post-addition Procedure

Each production for the catalyst component powder by ceria pre-addition procedure and ceria post-addition procedure is the same as that of in Example 1 except that ceria is used in place of alumina. By the ceria pre-addition procedure, two kinds of the catalyst component powder were prepared each containing ceria in an amount of 40% or 20% by weight of a total weight of ceria and H type ZSM-5, while, by the ceria post-addition procedure, two kinds of the catalyst component powder each containing ceria in an amount of 40% or 20% by weight of a total weight of ceria and H type ZSM-5. Honeycomb catalyst members were produced using the resulted catalyst powders as is Example 1. All procedures and conditions except those concerning ceria were the same as those in Example 1.

With respect to each of the honeycomb catalyst member thus produced, the same rig test and the same actual automobile test were carried out as in Example 1. The results are shown in Tables 3 and 4.

TABLE 3

| | | | | Rig Test | | | | | | | |
|---|---|---|---|---|---|---|---|---|---|---|---|
| | | | | Fresh | | 700° C. × 25 hr | | 800° C. × 8 hr | | 700° C. × 25 hr → 800° C. × 8 hr | |
| | Additive | Addition Procedure | Added Amount | Cleaning Ratio | Shifted Amount | Cleaning Ratio | Shifted Amount | Cleaning Ratio | Shifted Amount | Cleaning Ratio | Shifted Amount |
| Example 2 | Ceria | Pre | 20% | 51.0% | +12° C. | 50.2% | +11° C. | 44.4% | +14° C. | 36.0% | +15° C. |
| | | Pre | 40% | 80.0% | +19° C. | 49.3% | +14° C. | 43.4% | +4° C. | 38.0% | +4° C. |
| | | Post | 20% | 56.3% | −5° C. | 52.5% | +18° C. | 48.3% | −1° C. | 38.8% | +7° C. |
| | | Post | 40% | 55.2% | −5° C. | 47.3% | +40° C. | 42.5% | +14° C. | 37.5% | +13° C. |
| | Comparative Example | | | 53.3% | 235° C. | 52.5% | 250° C. | 48.3% | 266° C. | 38.0% | 270° C. |

Pre: Pre-addition procedure
Post: Post-addition procedure

TABLE 4

| | | | | Actual Automobile Test | | | |
|---|---|---|---|---|---|---|---|
| | | | Added | Fresh | | 700° C. × 25 hr | |
| | Additive | Addition Procedure | Amount (%) | HC Cleaning Ratio (%) | NOx Cleaning Ratio (%) | HC Cleaning Ratio (%) | NOx Cleaning Ratio (%) |
| Example 2 | Ceria | Pre | 20 | 95.0 | 23.4 | 88.8 | 29.0 |
| | | Pre | 40 | 95.1 | 25.6 | 89.1 | 30.3 |
| | | Post | 20 | 96.8 | 23.3 | 86.8 | 28.5 |
| | | Post | 40 | 95.8 | 20.4 | 84.3 | 39.5 |
| | Comparative Example | | | 96.7 | 19.8 | 87.0 | 23.8 |

Pre: Pre-addition procedure
Post: Post-addition procedure

It is seen from Table 3 that the ceria addition improves the NOx cleaning ratio of the fresh member, that the pre-addition procedure provides the temperature shifting effect the post-addition procedure requires the aging treatment so as to provide the temperature shifting effect and that the aging treatment greatly affects the temperature shifting effect. From the data of the thermal treatments under conditions of 800° C. for 8 hours and the data of the thermal treatments under conditions of from 700° C. for 25 hours and then 800° C. for 8 hours, it is seen that the temperature shifting effect can be maintained even though the catalyst has been subjected to a relatively high temperature experience.

It is seen from Table 4 concerning the actual automobile test that the catalyst powders of both of the 40% ceria pre- and post-addition procedures shows the higher NOx cleaning ratio. So, it is understood that the temperature shifting effect improves the NOx cleaning ratio.

Ceria Pre-addition Procedure (Temperature dependency of NOx cleaning ratio and HC cleaning ratio)

Figure 3:
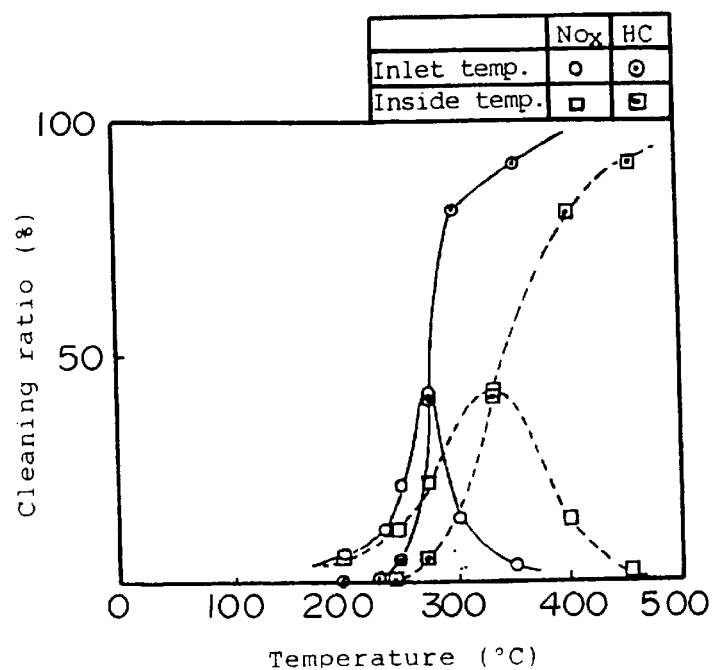
FIG. 3 is a graph which shows temperature dependencies of a NOx cleaning ratio and a HC cleaning ratio with respect to a honeycomb catalyst member carrying a catalyst component which comprises 40% by weight of ceria through a pre-addition procedure.
Figure 4:
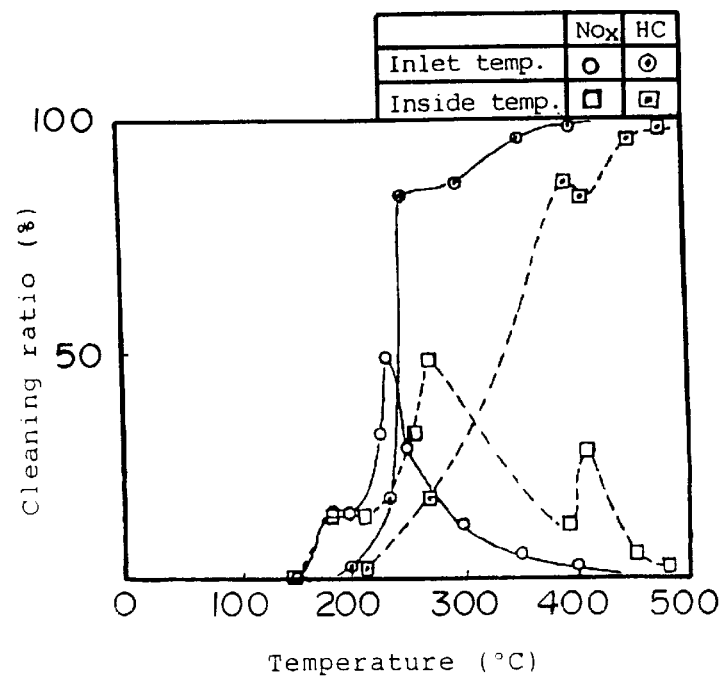
FIG. 4 is a graph which shows temperature dependencies of a NOx cleaning ratio and a HC cleaning ratio with respect to a honeycomb catalyst member of Comparative Example (no oxide addition)

FIG. 3 shows a graph indicating the temperature dependency of the NOx cleaning ratio and the HC cleaning ratio for the catalyst member comprising the catalyst powder containing ceria of 40% by weight produced by the ceria pre-addition procedure as described above. In the graph, a solid line shows the dependency on a gas temperature at an inlet of the honeycomb catalyst member (inlet temp.), and a broken line shows the dependency on a temperature of the honeycomb catalyst member inside (inside temp.). It is understood that a catalyst function is actually controlled by the temperature of the catalyst member inside. FIG. 4 shows a graph indicating the temperature dependency for the Comparative catalyst member as in FIG. 3. Thought the production procedures for the test members and the conditions such as a supported amount of the noble metal active component were the same as in the alumina case described above, the test members themselves were not the same as in the above case. Therefore, the values such as the maximum NOx cleaning ratio were different from those in the above case.

When FIG. 3 is compared with FIG. 4, it is seen that a catalyst inside temperature at which the maximum NOx cleaning ratio was observed with Example test members (FIG. 3) is shifted to the high temperature side from the case of the Comparative test members (FIG. 4) by about 60° C. As to the HC cleaning ratio, the hydrocarbon is more cleaned at a relatively higher temperature in the Example test members, which seems to at least partially affect the temperature shifting effect of the NOx cleaning ratio.

Ceria Post-addition Procedure (Temperature dependency of NOx cleaning ratio and HC cleaning ratio)

Figure 5:
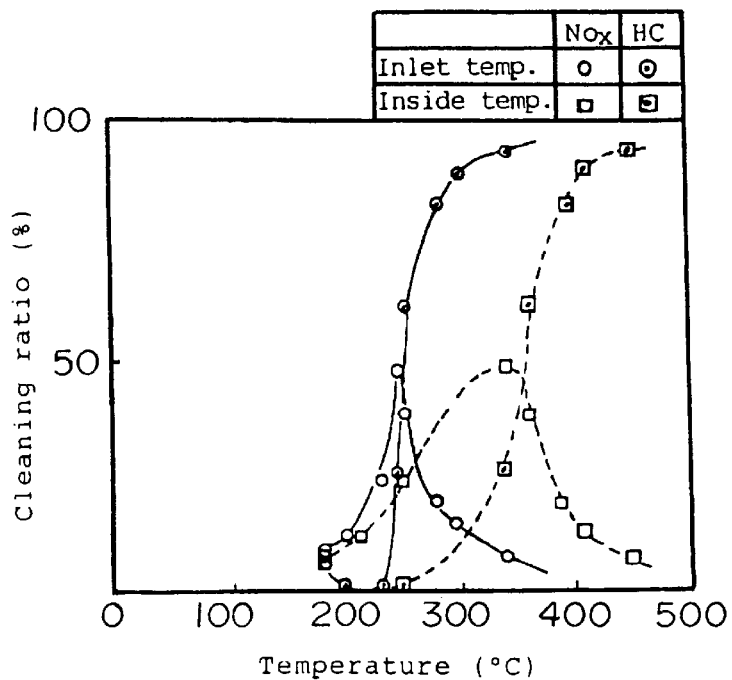
FIG. 5 is a graph which shows temperature dependencies of a NOx cleaning ratio and a HC cleaning ratio with respect to a honeycomb catalyst member carrying a catalyst component which comprises 40% by weight of ceria through a post-addition procedure.

FIG. 5 shows a graph indicating the temperature dependency of the NOx cleaning ratio and the HC cleaning ratio for the catalyst member comprising the catalyst component powder containing ceria of 40% by weight produced by the ceria post-addition procedure. When compared with FIG. 4, no temperature shifting effect is not observed with respect to the gas temperature at the catalyst member inlet. However, it is seen that the same as in the member produced by the ceria pre-addition procedure is seen with respect to the catalyst member inside temperature. On the comparison with the ceria pre-addition procedure (FIG. 3), the ceria post-addition procedure is more advantageous in the NOx cleaning ratio.

Then, the effect of the aging treatment (activation treatment) was studied using the ceria post-addition procedure.

Aging Treatment Before Wash Coating

Figure 6:
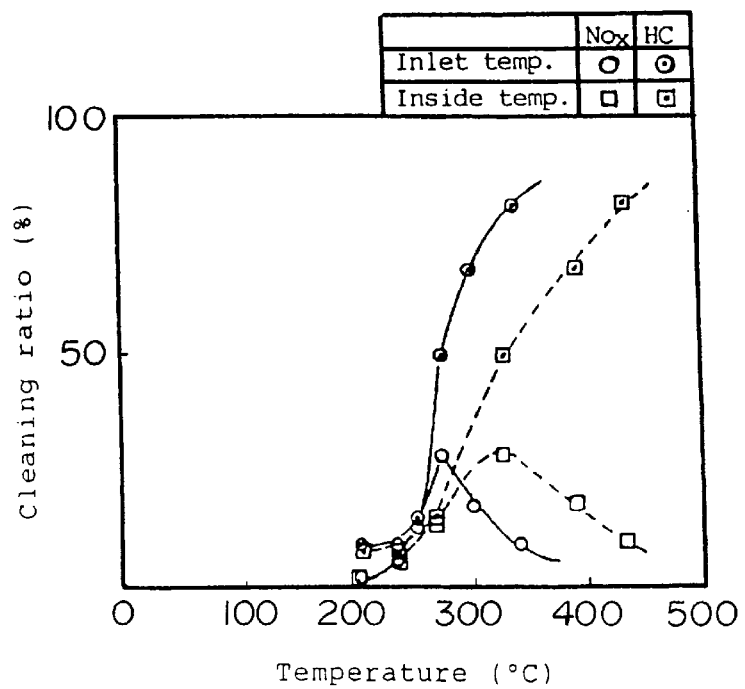
FIG. 6 is a graph which shows temperature dependencies of a NOx cleaning ratio and a HC cleaning ratio with respect to a honeycomb catalyst member produced by aging catalyst component powder which comprises ceria added through a post-addition procedure and then wash coating the powder on a honeycomb member.

FIG. 6 shows temperature dependency of the NOx cleaning ratio and the HC cleaning ratio of a honeycomb catalyst member which was produced by preparing the catalyst component powder which contained ceria of 40% by weight of ceria through the post-addition procedure, then aging the powder at a temperature of 700° C. for 25 hours followed by wash coating on a honeycomb support.

When FIG. 6 is compared with FIG. 5 which shows the results of the member without the aging, it is seen that a remarkable temperature shift is observed with respect to the gas temperature at the inlet. However, since the aging was carried out when the catalyst was in the form of powder, the NOx cleaning ratio is small and the HC cleaning ratio is also small.

Figure 7:
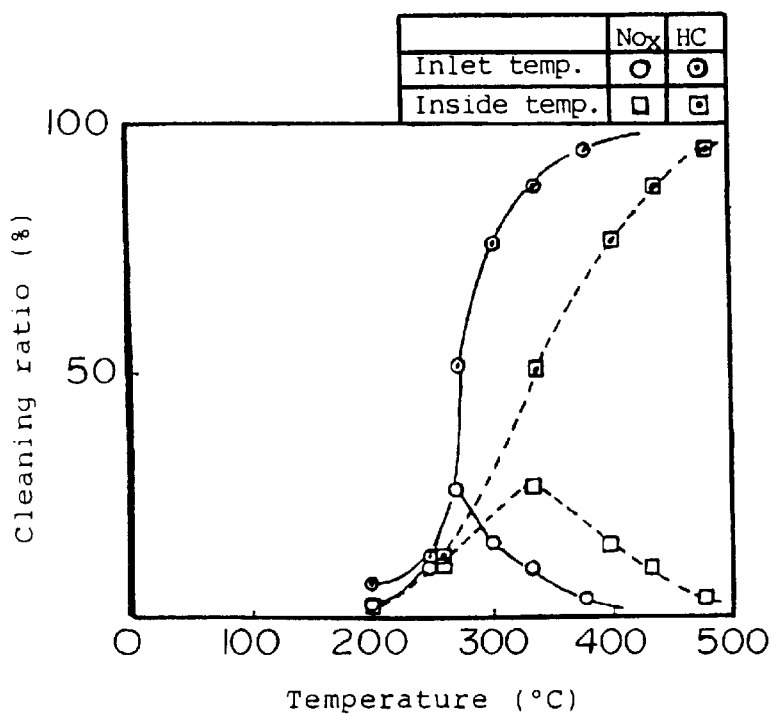
FIG. 7 is a graph which shows temperature dependencies of a NOx cleaning ratio and a HC cleaning ratio with respect to a honeycomb catalyst member produced by mixing main catalyst component powder which has been aged with ceria and then wash coating the powder on a honeycomb member.

FIG. 7 shows temperature dependency of the NOx cleaning ratio and the HC cleaning ratio of a honeycomb catalyst member which was produced by aging the H type ZSM-5 (having a $SiO_2/Al_2O_3$ ratio of 70) as the main catalyst component (which carried active components of Pt, Ir and Rh (total amount 4.5 g/liter) in a weight ratio (Pt:Ir:Rh) of 30:6:1) at a temperature of 700° C. for 25 hour, then mixing the main catalyst component with ceria (40% by weight) to have a mixture and then wash coating the mixture on a honeycomb support.

When the results of FIG. 7 are compared with those of FIG. 6 (aging after mixing the main catalyst component powder with ceria), there is no substantial difference between them in the NOx cleaning ratio and its temperature dependency. However, as to the HC cleaning ratio, FIG. 7 shows the higher results, from which it is seen that mixing with ceria after aging of the main catalyst component alone is preferable.

Aging Conditions Before Wash Coating

Various aging treatments of the main catalyst component were carried out in air with varying an aging temperature and an aging period so as to observe a relationship between the aging conditions and an shifted amount of the maximum active temperature (at which the maximum NOx cleaning ratio is observed with respect to the gas temperature at the catalyst member inlet) toward the higher temperature side. Simultaneously, conditions which provides the NOx cleaning ratio below 40% were also examined. It is noted that no oxide was added. The results are shown in FIG. 8.

Figure 8:
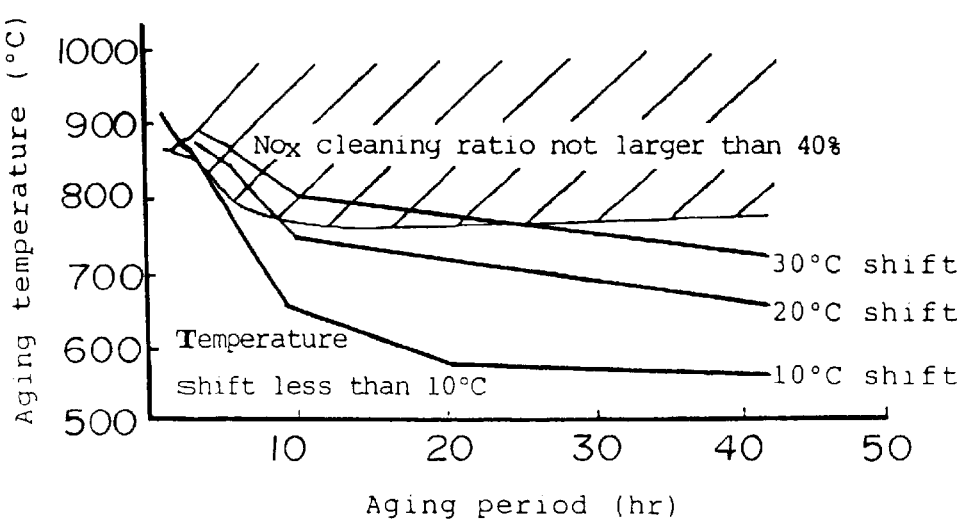
FIG. 8 is a graph which shows temperature dependencies of a NOx cleaning ratio and a HC cleaning ratio with respect to a honeycomb catalyst member produced by wash coating main catalyst component powder which has been aged on a honeycomb member.

It is seen from FIG. 8 that the aging temperature above 550° C. provides a preferable temperature shifting effect and the NOx cleaning ratio is likely to be decreased with the aging temperature above 850° C., and that the aging temperature thus is preferable in a range of 550 to 850° C.

Aging After Wash Coating

Figure 9:
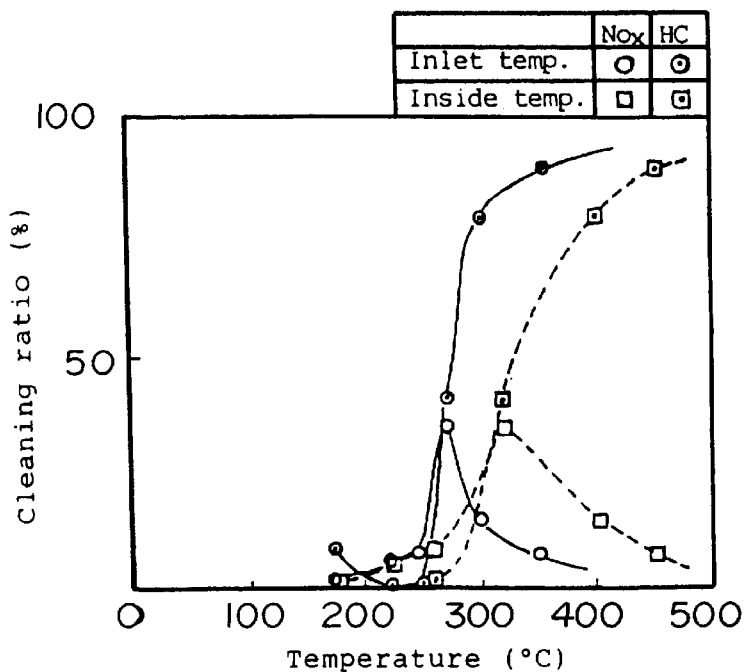
FIG. 9 is a graph which shows temperature dependencies of a NOx cleaning ratio and a HC cleaning ratio with respect to a honeycomb catalyst member produced by wash coating catalyst component powder which comprises ceria added through a post-addition procedure on a honeycomb member and then aging the member.

FIG. 9 shows the temperature dependency of the NOx cleaning ratio and the HC cleaning ratio of the honeycomb catalyst member produced by preparing the catalyst component powder containing 40% by weight of ceria by the post-addition procedure, wash coating the powder on a honeycomb support and then aging the support at a temperature of 700° C. for 25 hours.

When the results of FIG. 9 are compared with those of FIGS. 6 and 7 (wash coating after aging), there is almost no difference between them in the temperature shifting of the NOx cleaning ratio. However, the NOx cleaning ratio itself is higher in FIG. 9 than in FIGS. 6 and 7. Thus, it is seen that aging after wash coating of the catalyst powder produced by the ceria post-addition procedure is preferable from a view point of the NOx cleaning ratio.

Figure 10:
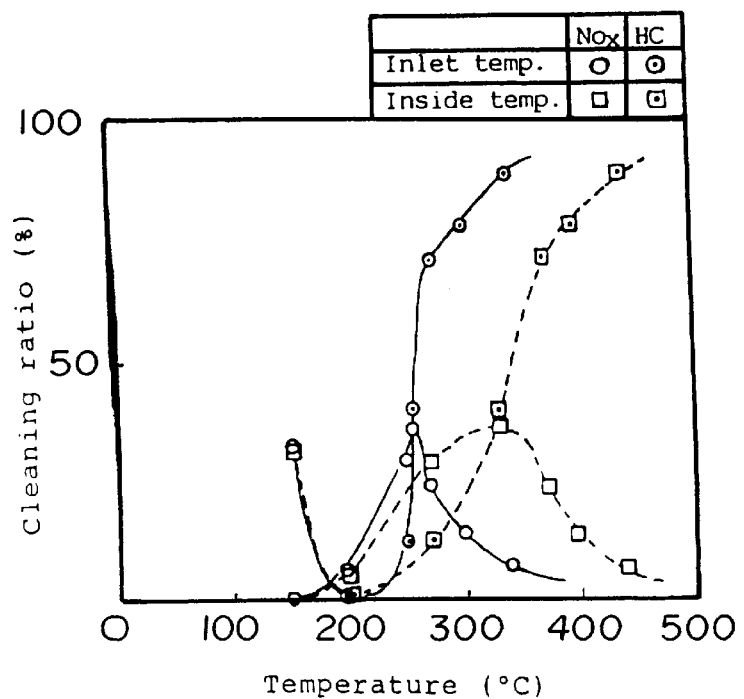
FIG. 10 is a graph which shows temperature dependencies of a NOx cleaning ratio and a HC cleaning ratio with respect to a honeycomb catalyst member produced by wash coating only main catalyst component powder with a binder and then aging the member.

When the results of FIG. 9 are compared with those of FIG. 10 (aging after wash coating only the main catalyst component powder with the binder on a honeycomb support), the active temperature of the NOx cleaning of the former is higher than those of the latter, which shows the temperature shifting effect due to the ceria addition.

Conditions of Aging After Wash Coating

Various aging treatments were carried out in the air with varying an aging temperature and an aging period so as to observe a relationship between the aging conditions and the shifted amount of the maximum active temperature (at which the maximum NOx cleaning ratio was observed). Simultaneously, conditions which provides the NOx cleaning ratio below 40% were examined. It is noted that no oxide was added. The results are shown in FIG. 11.

Figure 11:
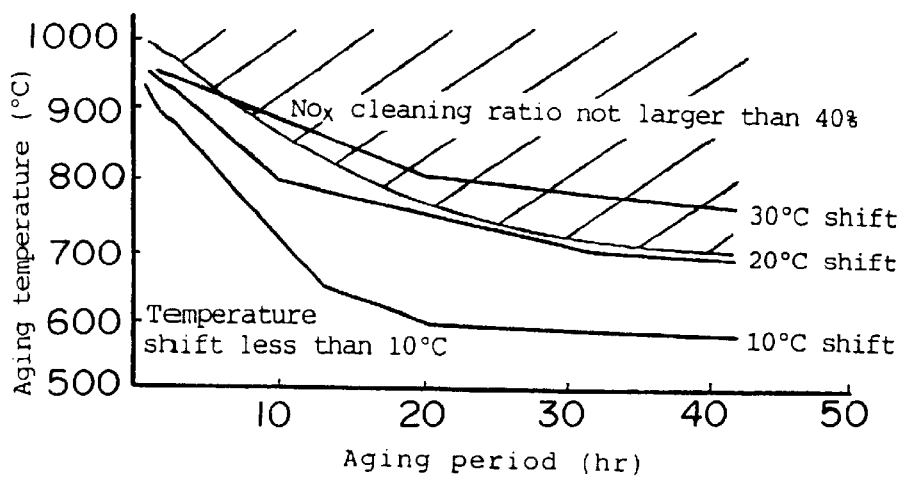
FIG. 11 is a graph which shows a relationship between aging conditions under which a main catalyst component powder was aged after wash coating and a shifted amount of temperature and a NOx cleaning ratio.

It is seen from FIG. 11 that the aging temperature above 550° C. provides a preferable temperature shifting effect and the NOx cleaning ratio is likely to be decreased with the aging temperature above 900° C., and that the aging temperature is preferable in a range of 550 to 900° C.

Comparison Between Aging Treatments Before and After Wash Coating Treatments

Using the main catalyst component powder as described above, a plurality of the honeycomb catalyst members having the temperature shifting of about 20° C. were produced by wash coating the powder after the aging treatment at a temperature of 700° C. for 12 hours. Further, using the same main catalyst component powder, another plurality of the honeycomb catalyst members having the temperature shifting of about 20° C. were produced by wash coating the powder on the honeycomb member without previous aging, and then aging at a temperature of 700° C. for 20 hours. With respect to those members, an average and scattering of the maximum NOx cleaning ratios for the fresh members and the maximum NOx cleaning ratios and a degradation ratio of the maximum cleaning ratio from the fresh member state for the members after the thermal treatment at a temperature of 800° C. for 8 hours were measured and the results are shown in Table 5 below in which Degradation ratio=[(initial cleaning ratio when fresh−cleaning ratio after aging)/(initial cleaning ratio when fresh)]×100.

TABLE 5

|  | NOx Cleaning Ratio | Scattering of Cleaning Ratio (σ) | NOx Cleaning Ratio After 800° C. × 8 hr | Degradation Ratio of NOx Cleaning Ratio |
|---|---|---|---|---|
| Aging before Wash Coating (700° C. × 12 hr) | 48% | 2.1 | 28% | 40% |
| Aging after Wash Coating (700° C. × 20 hr) | 44% | 3.8 | 34% | 25% |

It is seen from Table 5 that aging before the wash coating is preferable for the stable performance of the honeycomb catalyst member, and that aging after the wash coating is preferable for the improvement of the honeycomb heat resistance of the honeycomb catalyst member.

Space Velocity (SV) Property with Pre-addition Procedure

Figure 12:
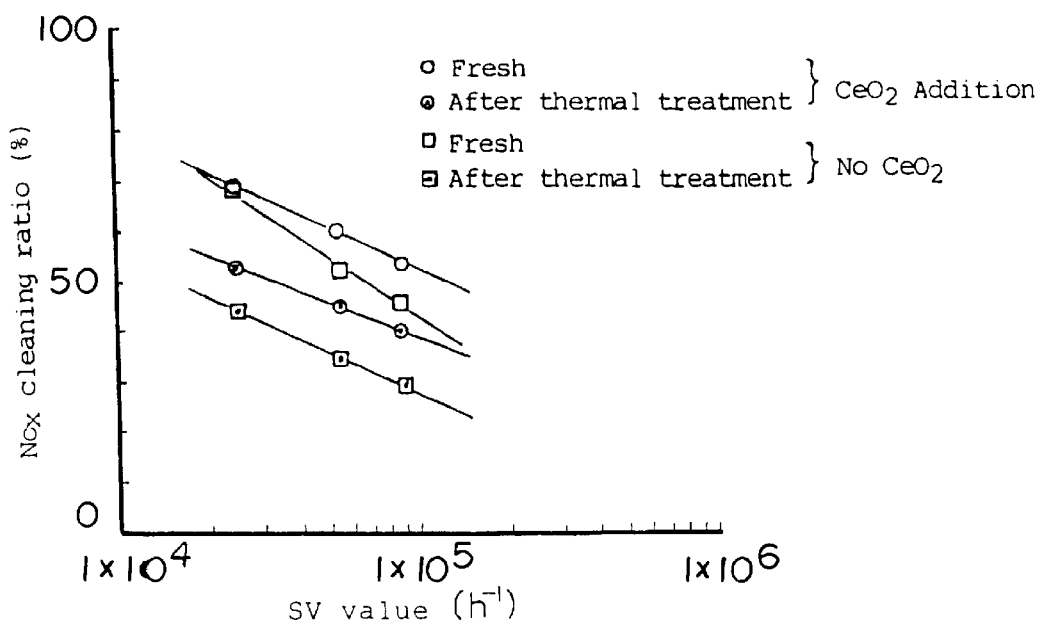
FIG. 12 is a graph which shows an SV property of a honeycomb catalyst member of a pre-addition mode and a Comparative member.

The SV property of the NOx cleaning ratio was observed with respect to honeycomb catalyst members produced by using the catalyst powder (containing 40% by weight of ceria) produced by the pre-addition procedure and honeycomb catalyst members produced by using only the main catalyst component powder as described above. As the test members, fresh members and thermally treated members (at a temperature of 800° C. for 8 hours) were prepared. 25000 $Hr^{-1}$, 55000 $hr^{-1}$ and 89000 $hr^{-1}$ were used as the space velocity. The results are shown in FIG. 12 and the results for the fresh members are also shown in Table 6 below.

TABLE 6

|  | NOx Cleaning Ratio | | |
| --- | --- | --- | --- |
|  | SV = 25000/hr | SV = 55000/hr | SV = 89000/hr |
| With Added Ceria | 69.0% | 60.0% | 54.1% |
| Without Added Ceria | 63.8% | 53.3% | 45.8% |

From the results for the fresh member, there is not so large difference between "with ceria" and "without ceria" in the NOx cleaning ratio at a low SV. However, with increasing of SV, the NOx cleaning ratio of the member without ceria is more greatly reduced than the member with ceria. The data for the thermally treated members, the similar tendency is observed. Therefore, it is seen that the ceria pre-addition improves the SV property with respect to the NOx cleaning ratio.

Preferable Amount Range of Ceria Addition Through Pre-addition Procedure

With rig tests and fresh catalyst test members, a relationship between an amount of added ceria through the pre-addition procedure and an amount of the shifted temperature and the NOx cleaning ratio was observed. For the production of the test members, the same procedure and the same conditions as described above were repeated except that only an amount of the added ceria was changed. Further, the simulated gas used in the rig tests was as described above so as to obtain SV=55000 $hr^{-1}$. The results are shown in FIG. 13.

Figure 13:
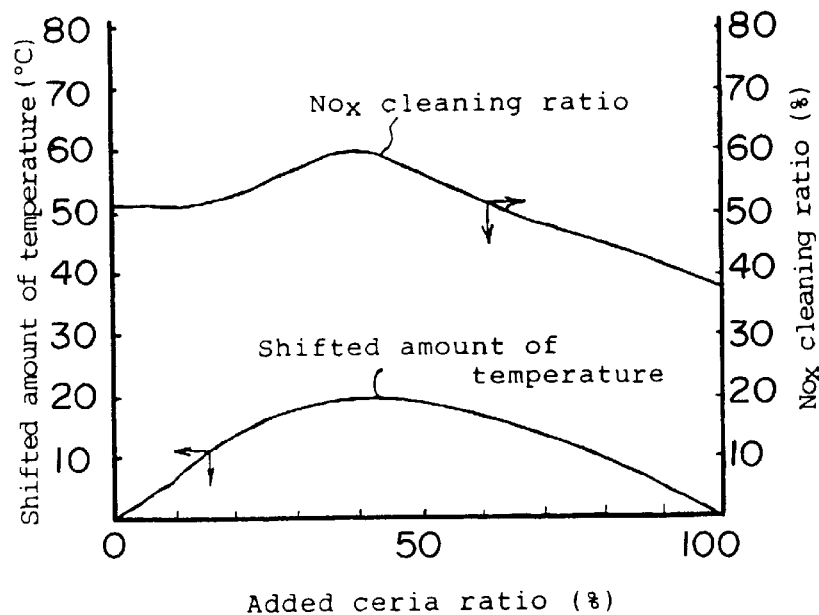
FIG. 13 is a graph which shows a relationship between an added amount of ceria through a pre-addition procedure and a shifted amount of temperature.

It is preferable on the basis of the results shown in FIG. 13 that the added amount of ceria is not less than 5% by weight for the purpose of the temperature shift of at least few degrees centigrade and not more than 70% by weight for the purpose of the prevention of the NOx cleaning ratio decrease. In addition, the added amount of ceria in a range of 15 to 50% by weight is more preferable.

Preferable Amount Range of Ceria Addition Through Post-addition Procedure

With rig tests and test members with wash coating before-aging (700° C.×25 hrs.), a relationship between an amount of added ceria through the post-addition procedure and an amount of the shifted temperature and the NOx cleaning ratio was observed. For the production of the test members, the same procedure and the same conditions as described above were repeated except that only an amount of the added ceria was changed. Further, the simulated gas used in the rig tests was as described above so as to obtain SV=55000 $hr^{-1}$. The results are shown in FIG. 14.

Figure 14:
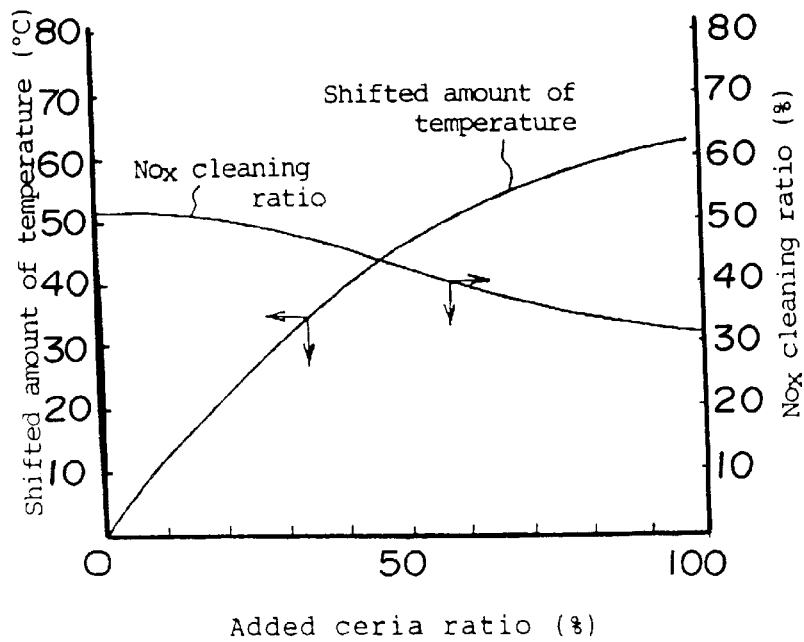
FIG. 14 is a graph which shows a relationship between an added amount of ceria through a post-addition procedure and a shifted amount of temperature.

It is preferable on the basis of the results shown in FIG. 14 that the added amount of ceria is not less than 5% by weight for the purpose of the temperature shift of at least few degrees centigrade and not more than 60% by weight for the purpose of the prevention of the NOx cleaning ratio decrease. In addition, the added amount of ceria in a range of 10 to 50% by weight is more preferable.

Example 3 (Alumina and ceria addition)

This Example used alumina and ceria as co-catalysts. As in Example 1, there are two procedures; one is the pre-addition procedure and the other is the post-addition procedure.

Each production of catalyst component powder by the pre-addition procedure and the post-addition procedure is the same as that of in Example 1 except that an oxide of ceria and alumina was used in place of alumina. By the pre-addition procedure, two kinds of the catalyst component powder each containing the oxide in an amount of 40% or 20% by weight were produced, while, by the post-addition procedure, two kinds of the catalyst component powder each containing the oxide in an amount of 40% or 20% by weight were produced. Honeycomb catalyst members were produced using the resulted catalyst component powder as is Example 1. A weight ratio (alumina/ceria) was 3/2. All procedures and conditions such as the kind of the noble metal active component and its used amount except that the oxide was used were the same as those in Example 1.

With respect to each of the honeycomb catalyst members thus produced, the same rig test and the actual automobile test were carried out as in Example 1. The results are shown in Tables 7 and 8.

TABLE 7

| | | | | Rig Test | | | | | | | |
| --- | --- | --- | --- | --- | --- | --- | --- | --- | --- | --- | --- |
| | | | | Fresh | | 700° C. × 25 hr | | 800° C. × 8 hr | | 700° C. × 25 hr → 800° C. × 8 hr | |
| | Additive | Addition Procedure | Added Amount | Cleaning Ratio | Shifted Amount | Cleaning Ratio | Shifted Amount | Cleaning Ratio | Shifted Amount | Cleaning Ratio | Shifted Amount |
| Example 3 | Alumina | Pre | 20% | 60.8% | +6° C. | 43.8% | +15° C. | 44.5% | +2° C. | 35.1% | +15° C. |
| | Ceria | Pre | 40% | 57.5% | +10° C. | 47.3% | +23° C. | 40.8% | +13° C. | 33.2% | +6° C. |
| | | Post | 20% | 58.5% | 0° C. | 41.2% | +50° C. | 38.3% | +11° C. | 25.2% | +25° C. |
| | | Post | 40% | 55.1% | +15° C. | 40.2% | +50° C. | 42.0% | +11° C. | 30.2% | +25° C. |
| | Comparative Example | | | 53.3% | 235° C. | 52.5% | 250° C. | 48.3% | 266° C. | 38.0% | 270° C. |

Pre: Pre-addition procedure
Post: Post-addition procedure

TABLE 8

|  | Additive | Addition Procedure | Added Amount (%) | Actual Automobile Test | | | |
|---|---|---|---|---|---|---|---|
|  |  |  |  | Fresh | | 700° C. × 25 hr | |
|  |  |  |  | HC Cleaning Ratio (%) | NOx Cleaning Ratio (%) | HC Cleaning Ratio (%) | NOx Cleaning Ratio (%) |
| Example 3 | Alumina Ceria | Pre | 20 | 97.2 | 30.0 | 89.9 | 38.8 |
|  |  | Pre | 40 | 96.5 | 32.4 | 89.4 | 38.8 |
|  |  | Post | 20 | 98.1 | 34.4 | 90.1 | 38.5 |
|  |  | Post | 40 | 96.7 | 36.0 | 90.4 | 40.0 |
|  | Comparative Example |  |  | 96.7 | 19.8 | 87.0 | 23.8 |

Pre: Pre-addition procedure
Post: Post-addition procedure

It is seen from Table 7 that the addition of alumina and ceria improves the NOx cleaning ratio of the fresh catalyst member; that the temperature shifting effect is obtained with the pre-addition even with the fresh member, but it is not obtained with the post addition member when the added amount is small and thus aging is required so as to obtain the effect; and that aging remarkably affects the temperature shifting. From the data of the thermal treatment at a temperature of 800° C. for 8 hours and the data of the thermal treatment at a temperature of 700° C. for 25 hours and then 800° C. for 8 hours, it is seen that the temperature shifting effect is maintained even though the catalyst has been subjected to a relatively high temperature.

Considering the data of the actual automobile test shown in Table 8, the NOx cleaning ratio is high at the post addition of 40% by weight. It is seen that the temperature shift improves the NOx cleaning ratio.

Alumina/ceria Ratio

Various honeycomb catalyst members were produced using the pre-addition catalyst component as described above with varying the alumina/ceria weight ratio. The total added amount of alumina and ceria was 60% by weight based on a total mixture of alumina, ceria and H type ZSM-5 zeolite, and the others are the same as in the pre-addition procedure as described above.

Figure 15:
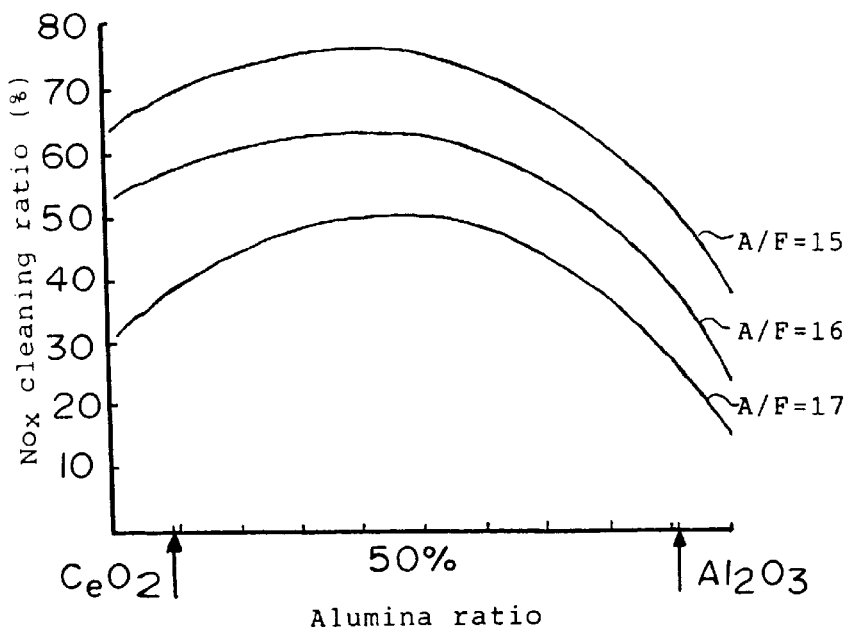
FIG. 15 is a graph which shows a relationship between an alumina/ceria ratio and a NOx cleaning ratio.

A simulated gas which corresponds to A/F=15, A/F=16 or A/F=17 was supplied to the honeycomb member at SV=55000 hr$^{-1}$, and a relationship between the alumina/ceria ratio and the maximum NOx cleaning ratio was observed. The results are shown in FIG. 15. It is seen from FIG. 15 that the catalyst member shows the better NOx cleaning ratio when an oxygen concentration in the exhaust gas is not so high or on a little lean mode, that no effect of mixing alumina and ceria is present when the alumina/ceria ratio is less than 0.1 or above 10, and that the more preferable ratio is in a range of about 0.5 to 4.

Various honeycomb catalyst members were produced with varying the alumina/ceria weight ratio using the catalyst prepared by the post-addition procedure. The production conditions were the same as those in the post-addition procedure as described above.

Figure 16:
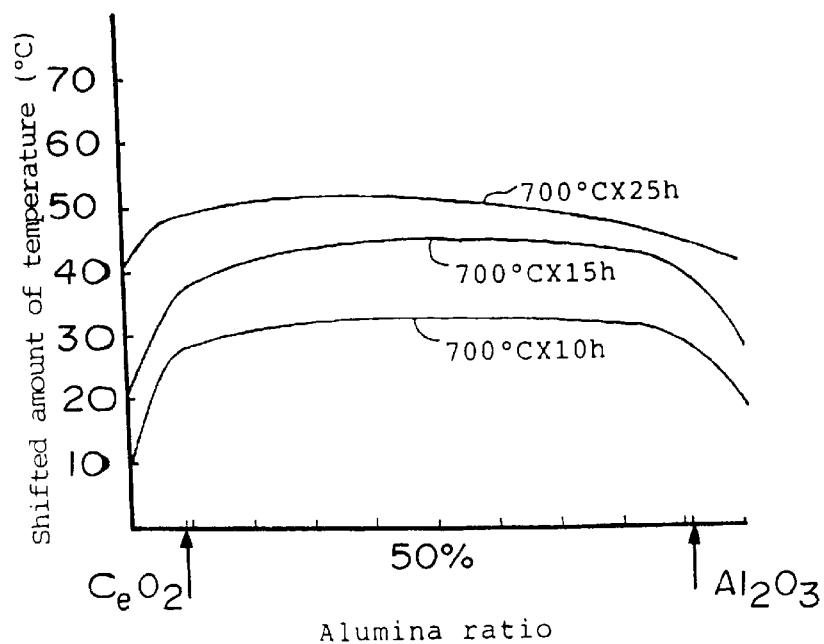
FIG. 16 is a graph which shows a relationship between an alumina/ceria ratio and a shifted amount of temperature.

The honeycomb catalyst members were subjected to the aging treatment at a temperature of 700° C. for 10 hours, 15 hours or 25 hours, and then a simulated gas corresponding to A/F=22 was supplied to the members at SV=55000 hr$^{-1}$ to observe a relationship between the alumina/ceria ratio and the shifted amount of the maximum active temperature toward the higher temperature side with respect to the NOx cleaning ratio. The results are shown in FIG. 16. It is seen from FIG. 16 that the members show a relatively large temperature shifting with the aging treatment and when the alumina/ceria ratio is less than 0.1 or above 10, the mixing effect of the both oxides is reduced.

Actual Automobile Test with Respect to Catalyst Members Produced in Examples 1 to 3

Figure 17:
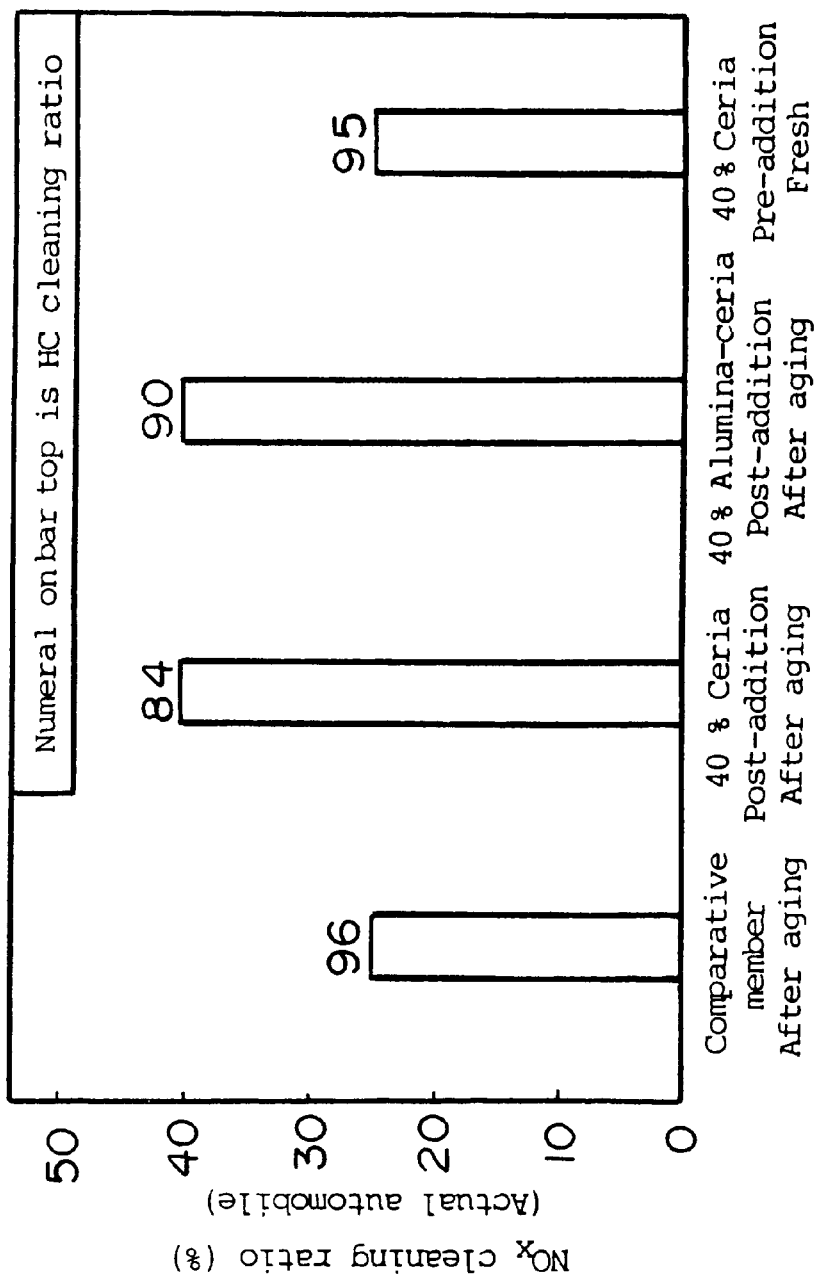
FIG. 17 is a graph which shows results of an actual automobile test with respect to a member of each Example.

FIG. 17 is a bar graph which shows the results of the actual automobile testes with respect to the catalyst members with 40 wt % ceria addition of the pre-addition procedure in Example 2, 40 wt % ceria addition of the post-addition procedure in Example 2 and 40 wt % alumina/ceria addition of the post-addition procedure in Example 3 and comparative honeycomb members. The numerical value on the top of the bar is the HC cleaning ratio.

The difference between the member with 40 wt % ceria pre-addition in Example 2 and the comparative member is unclear. However, there are remarkable differences between the member with 40 wt % ceria post-addition in Example 2 and the member with 40 wt % alumina/ceria post-addition in Example 3 and the comparative member.

Figure 18:
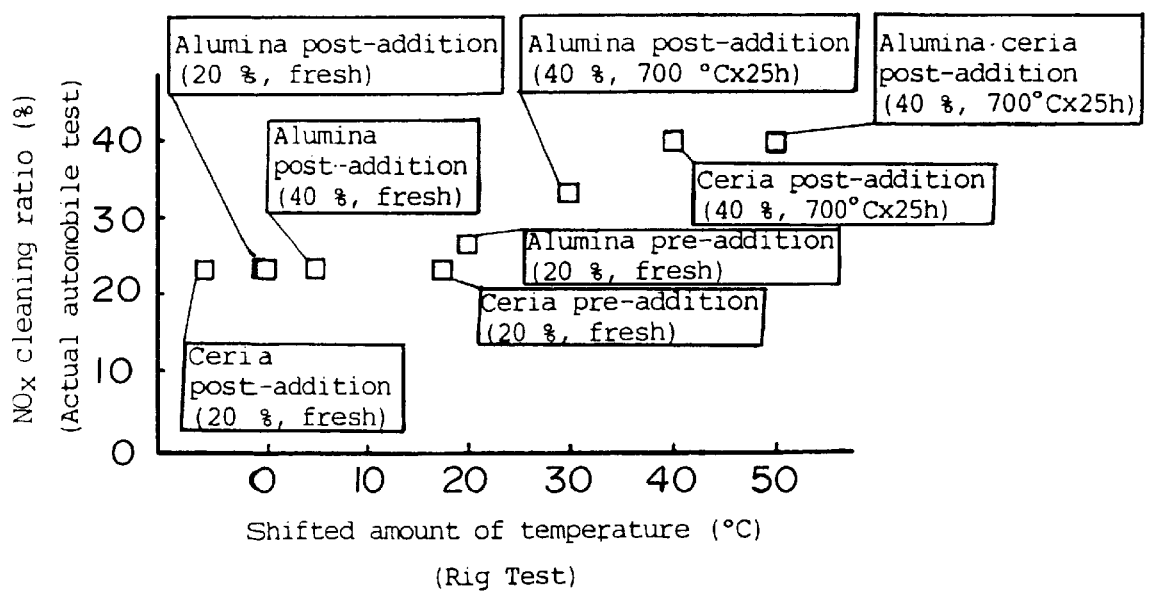
FIG. 18 is a graph which shows a relationship between a shifted amount of temperature and a NOx cleaning ratio with respect to a member of each Example.

FIG. 18 shows a graph in which a relationship between an amount of the temperature shift and the NOx cleaning ratio with respect to the members in Examples 1 to 3 and the comparative members. It is seen that the NOx cleaning ratio is increased as the temperature shift is increased.

Example 4 (Post addition of noble metal active component carrying oxide (alumina and ceria))

In this Example, alumina and ceria were used as the co-catalyst components and a noble metal active component was deposited on the co-catalyst components to have co-catalyst component powder. The powder was mixed with a main catalyst component of H type ZSM-5 which carries Pt, Ir and Rh to have a powder mixture. The mixture was wash coated on a honeycomb support with a binder.

The alumina/ceria weight ratio was 3/2, and the active components which were carried by the both oxides were Pt and Rh in a Pt/Rh weight ratio of 5/1. A total carried amount of the active components by the both oxides was 1.6 g/liter. With varying a mixing weight ratio of the co-catalyst components (powder) to the main catalyst component (powder), the HC cleaning ratio at a gas temperature of 300° C. at the catalyst member inlet, the maximum NOx cleaning ratio, a temperature at which 50% HC cleaning ratio was achieved and the temperature at which the maximum cleaning ratio was obtained were measured. In these measurements, a gas supplied to the member was a simulated gas corresponding to A/F=22. An amount of SV was 55000 hr$^{-1}$. The results are shown in FIG. 19.

Figure 19:
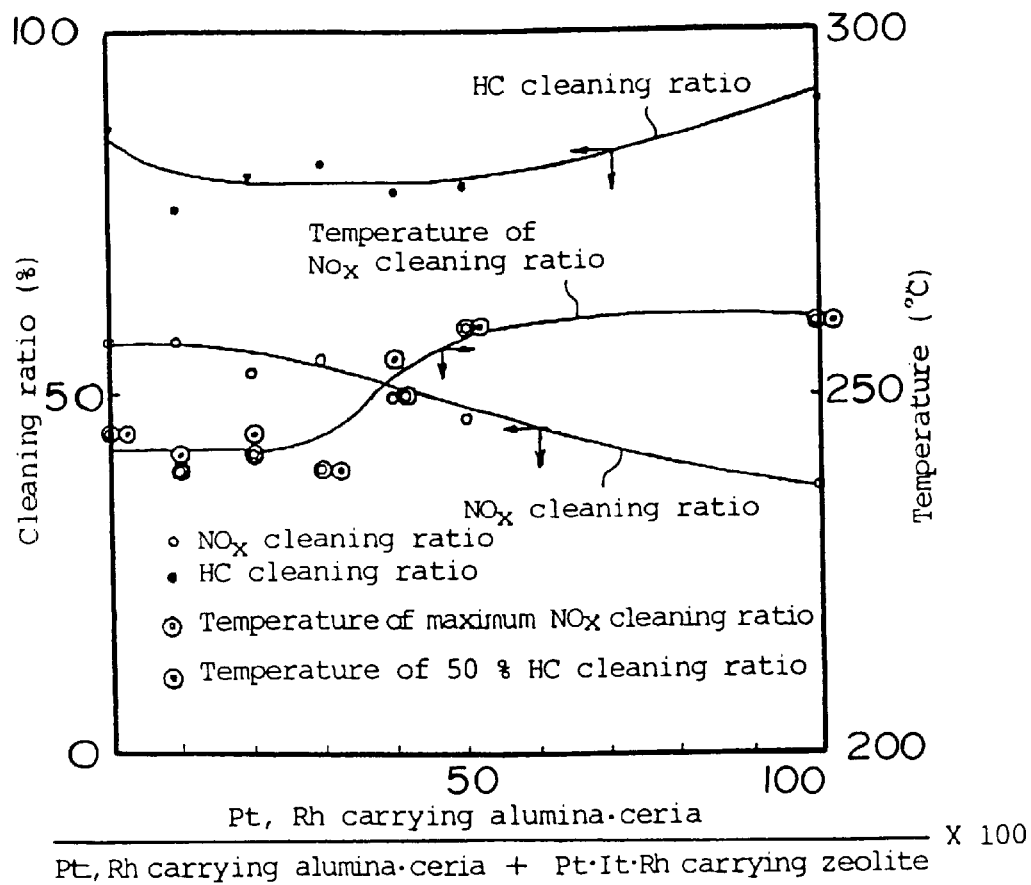
FIG. 19 is a graph which shows a relationship between an added amount of a noble metal active component carrying oxide and a maximum NOx cleaning ratio, a HC cleaning ratio, a temperature at which the maximum NOx cleaning ratio is achieved and a temperature at which 50% HC cleaning ratio is achieved.

It is seen from FIG. 19 that the maximum NOx cleaning ratio is increased when the mixing ratio is above 30% but decreased when the ratio is above 80%. As to the HC cleaning ratio, almost all showed the good results. Thus, the preferable mixing range is from 30 to 80% by weight.

Example 5 (Pre-addition of noble metal active component carrying oxide (alumina and ceria))

In this Example, a co-catalyst powder of oxide comprising alumina and ceria which carries Pt and Rh was mixed with H type ZSM-5 (having a $SiO_2/Al_2O_3$ ratio of 70) to have a mixture and then Pt, Ir and Rh were deposited on ZSM-5 in a weight ratio (Pt:Ir:Rh) of 30:6:1 to produce the catalyst component powder having a total deposited amount of 4.5 g/liter. The resulted powder was wash coated on a honeycomb support with a binder to produce the honeycomb catalyst member.

Figure 20:
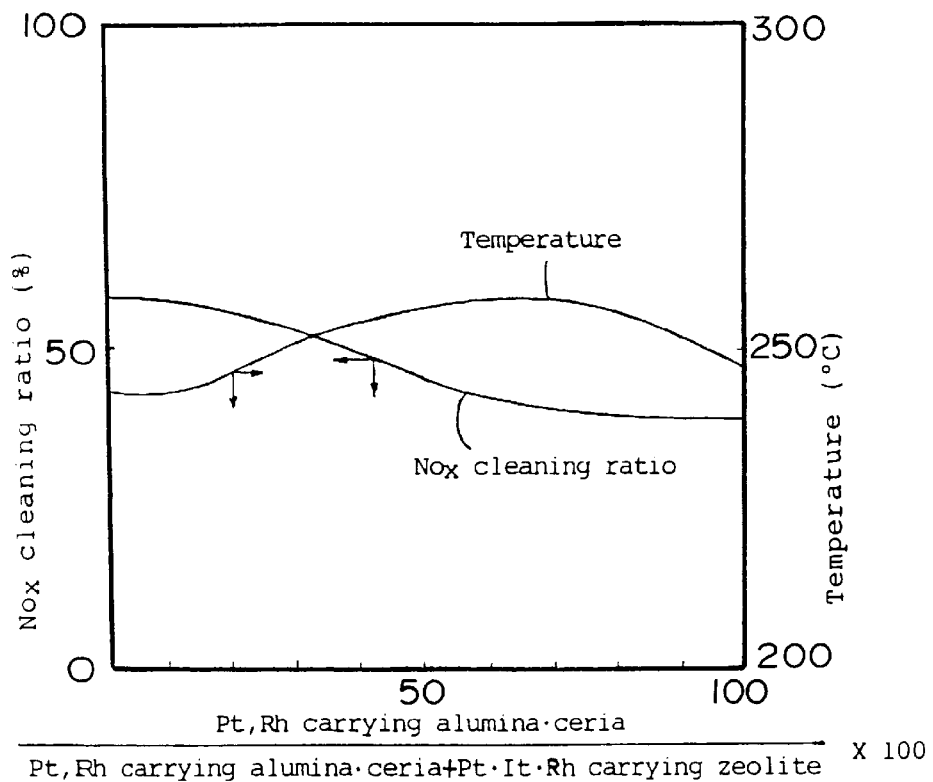
FIG. 20 is a graph which shows a relationship between an added amount of a noble metal active component carrying oxide and a maximum NOx cleaning ratio and a temperature at which the maximum NOx cleaning ratio is achieved.

With varying the mixing ratio of the co-catalyst powder as in Example 4, a relationship between the mixing ratio and the maximum NOx cleaning ratio and the temperature at which the maximum NOx cleaning ratio was achieved. The used gas conditions were the same as in Example 4. The results are shown in FIG. 20. It is seen from FIG. 20 that when the mixing ratio is increased, the temperature at which the maximum NOx cleaning ratio is achieved is shifted toward the high temperature side while the NOx cleaning ratio is decreased. From those results, a preferable mixing ratio is in a range of 20 to 80% by weight.

Example 6 (Suppression of $H_2S$ formation)

The honeycomb catalyst member according to Example 2 containing 40% by weight of ceria through the post-addition procedure was so impregnated with a nickel nitrate aqueous solution that 3.2 grams of nickel was carried by one liter of the wash coated catalyst component. A total amount of the carried noble metal active components was 2 g/liter. After the impregnation, the honeycomb member was calcined at a temperature of 500° C. for two hours to have a test member. Another test member was also produced in the same manner as just described above except that a salt aqueous solution of Mn or Co was used in place of the nickel nitrate solution. An carried amount of Mn or Co was the same as that of Ni.

A simulated lean gas corresponding to A/F=16 which comprised 50 ppm of $SO_2$ was flowed through the member for 10 minutes, and then the gas was switched to a simulated rich gas corresponding to A/F=14.5 and a peak concentration of formed $H_2S$. With respect to a honeycomb member comprising the catalyst component without nickel and so on, the peak $H_2S$ concentration was also measured similarly. The results are shown below:

| Added element | $H_2S$ concentration (ppm) |
| --- | --- |
| no addition | 120 |
| Ni | 30 |
| Mn | 30 |
| Co | 35 |

Figure 21:
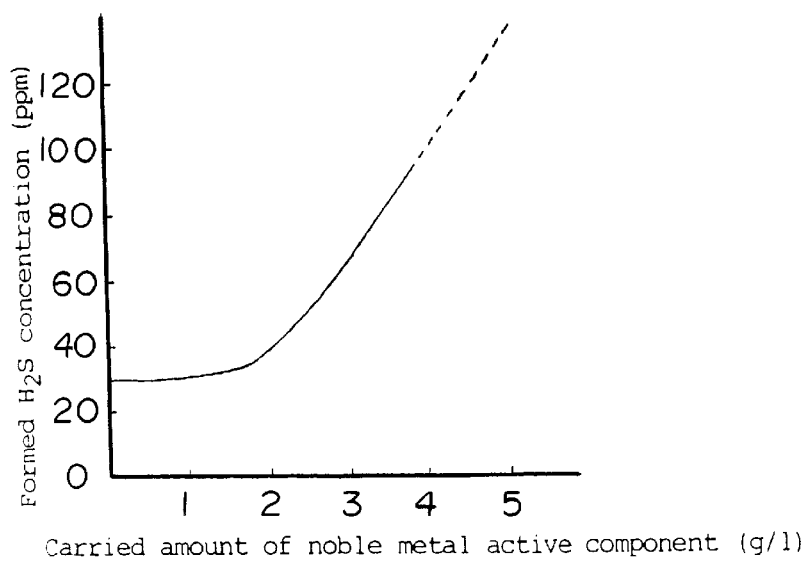
FIG. 21 is a graph which shows a relationship between an carried amount of a noble metal active component and a peak concentration of $H_2S$ with respect to a honeycomb catalyst member which comprises catalyst component containing impregnation carried nickel.

Since a concentration of $H_2S$ at which man feels as smell is above 35 ppm, the addition of Ni, Mn or Co is effective for the suppression of the formation of $H_2S$;

Catalyst members with Ni impregnation deposited amount of 3.2 g/liter which carries various amounts of the noble metal active components were produced and the $H_2S$ concentration was measured as described above. The results are shown in FIG. 21. It is seen from FIG. 21 that when the carried amount of the noble metal active component is increased, the formation of $H_2S$ is increased and that when the carried amount of the noble metal active component is not more than 2 g/liter, the formation of $H_2S$ can be so suppressed that man does not feel $H_2S$ as the smell.

Example 7

In this Example, a noble metal active component having a different oxidation number was used to achieve the temperature shifting effect.

Production of $Pt^{+4}$ Honeycomb Catalyst Member

Platinum tetrachloride ($PtCl_4$), iridium trichloride and rhodium nitrate were weighted to obtain a metal weight ratio (Pt:Ir:Rh) of 30:6:1 and a supported total amount of 4.5 g/liter-catalyst. $PtCl_4$ and rhodium nitrate were dissolved in ion-exchanged water and iridium trichloride was dispersed in propanol, and then both solutions were mixed together to have a mixture. H type ZSM-5 (having $SiO_2/Al_2O_3$ ratio of 70) was added to the mixture and stirred at room temperature for 2 hours. Then the mixture was dried before milling to have catalyst component powder.

The catalyst powder was thermally treated (activation treated) in air at a temperature of 200° C. for 14 hours and wash coated on a honeycomb support (400 cells/inch$^2$) made of a cordierite with a binder (hydrated alumina), and then dried in air at a temperature of 150° C. for 3 hours and then calcined in air at a temperature of 500° C. for 2 hours to produce the honeycomb catalyst member with $Pt^{+4}$ (Example 7-1).

Production of $Ir^{+4}$ Honeycomb Catalyst Member

The same procedures and conditions as in the production of the $Pt^{+4}$ honeycomb catalyst member as described above were used except that iridium tetrachloride ($IrCl_4$) as an Ir source was used to produce the honeycomb catalyst member with $Ir^{+4}$ (Example 7-2).

Production of $Pt^{+4}-Ir^{+4}$ Honeycomb Catalyst Member

The same procedures and conditions as in the production of the $Pt^{+4}$ honeycomb catalyst member as described above were used except that platinum tetrachloride ($PtCl_4$) as a Pt source and iridium tetrachloride ($IrCl_4$) as an Ir source were used to produce the honeycomb catalyst member with $Pt^{+4}$ and $Ir^{+4}$ (Example 7-3).

Production of Comparative Honeycomb Catalyst Member

The same procedures and conditions as in the production of the $Pt^{+4}$ honeycomb catalyst member as described above were used except that platinum (II) ammine crystal as a Pt source and iridium trichloride as an Ir source were used to produce the honeycomb catalyst member with $Pt^{+2}$ and $Ir^{+3}$.

Exhaust Gas Cleaning Property Estimation

Figure 26:
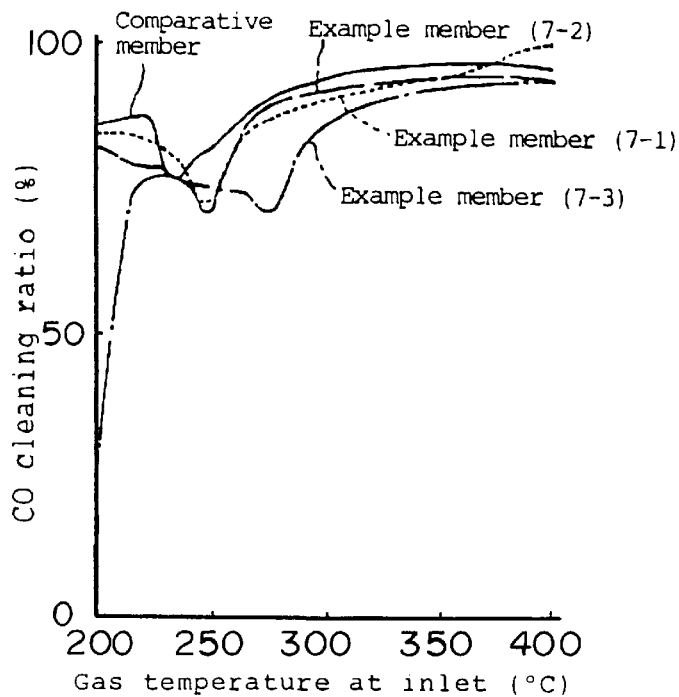
FIG. 26 is a graph which shows temperature dependencies of a CO cleaning ratio of each member of FIG. 22 at a fresh mode.
Figure 27:
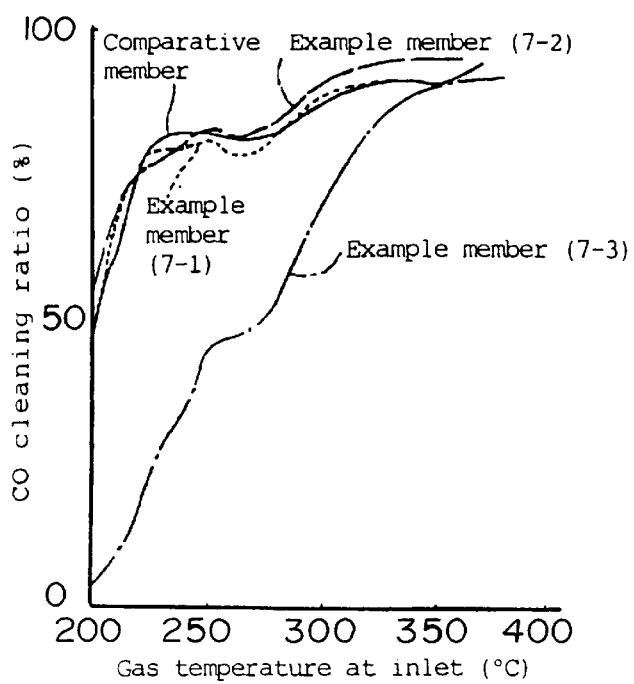
FIG. 27 is a graph which shows temperature dependencies of a CO cleaning ratio of each member of FIG. 22 after a thermal treatment.

With a rig test, a cleaning property of NOx, HC and CO of each honeycomb catalyst member at its fresh mode was estimated. A composition of the used simulated gas and the space velocity were shown below. In addition, with the rig test, the cleaning property of NOx, HC and CO of each honeycomb catalyst member was estimated after it was subjected to a thermal treatment at a temperature of 800° C. for 8 hours. The results are shown in FIG. 22 (fresh mode) and in FIG. 23 (after the thermal treatment) with respect to the NOx cleaning property, in FIG. 24 (fresh mode) and in FIG. 25 (after the thermal treatment) with respect to the HC cleaning property, and in FIG. 26 (fresh mode) and in FIG. 27 (after the thermal treatment) with respect to the CO cleaning property.

| | |
|---|---|
| NOx: 2000 ppm, | CO: 0.18% |
| HC: 6000 ppmC, | CO$_2$: 8.4% |
| O$_2$: 8.0% | |
| SV: 55000 HR$^{-1}$ | |

Figure 22:
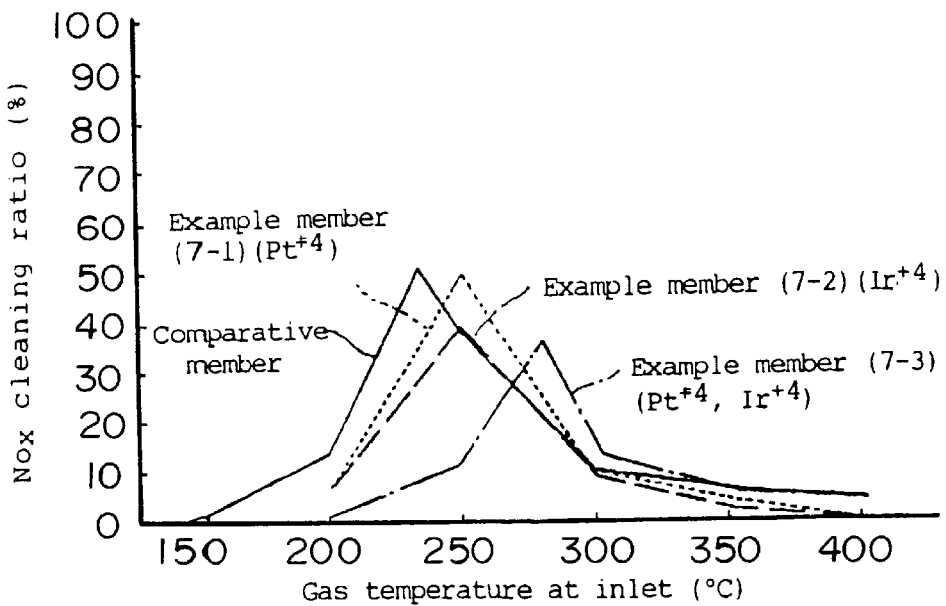
FIG. 22 is a graph which shows temperature dependencies of a NOx cleaning ratio with respect to a honeycomb catalyst members each comprising a catalyst component which contains $Pt^{+4}$, $Pt^{+4}$ plus $Ir^{+4}$ or $Ir^{+4}$.

As to the NOx cleaning ratio, it is seen from FIG. 22 that each of the Example members had the higher maximum active temperature than that of the Comparative member (+15 to +45° C.) which means that at least one of Pt and Ir having an oxidation number of four is effective for the temperature shift toward the higher temperature side. In addition, the Example member 7-1 (Pt has the oxidation number of +4) is advantageous since there is no substantial decrease of the maximum NOx cleaning ratio in comparison with the Comparative members. The Example member 7-3 (both of Ir and Pt have the oxidation numbers of +4) shows the remarkable temperature shift, which seems to be because of a synergistic effect of Pt$^{+4}$ and Ir$^{+4}$.

Figure 23:
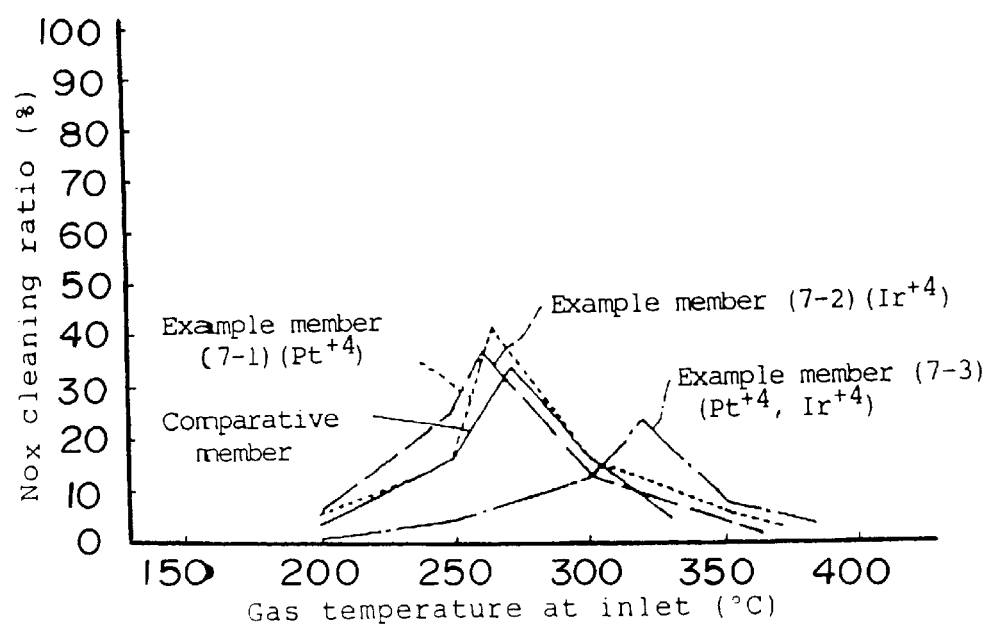
FIG. 23 is a graph which shows temperature dependencies of a NOx cleaning ratio of each member of FIG. 22 after a thermal treatment.

Considering the results shown in FIG. 23 with the members after the thermal treatment, the Example members of 7-1 and 7-2 do not show the temperature shifting effect from the case with the Comparative member. However, the Example member 7-3 shows the effect. The degradation ratio of the maximum NOx cleaning ratio after the thermal treatment is about 34% with the Comparative member while about 20% with the Example member 7-1, about 5% with the Example member 7-2, and about 35% with the Example member 7-3.

Figure 24:
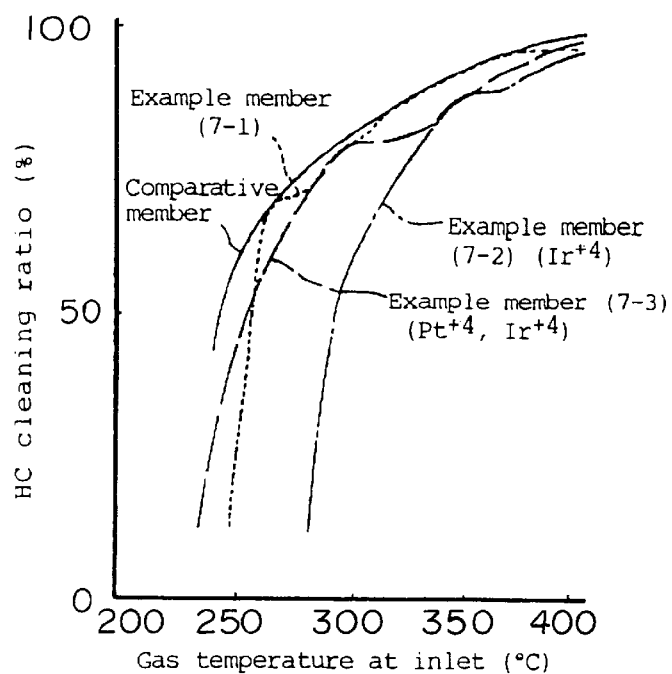
FIG. 24 is a graph which shows temperature dependencies of an HC cleaning ratio of each member of FIG. 22 at a fresh mode.
Figure 25:
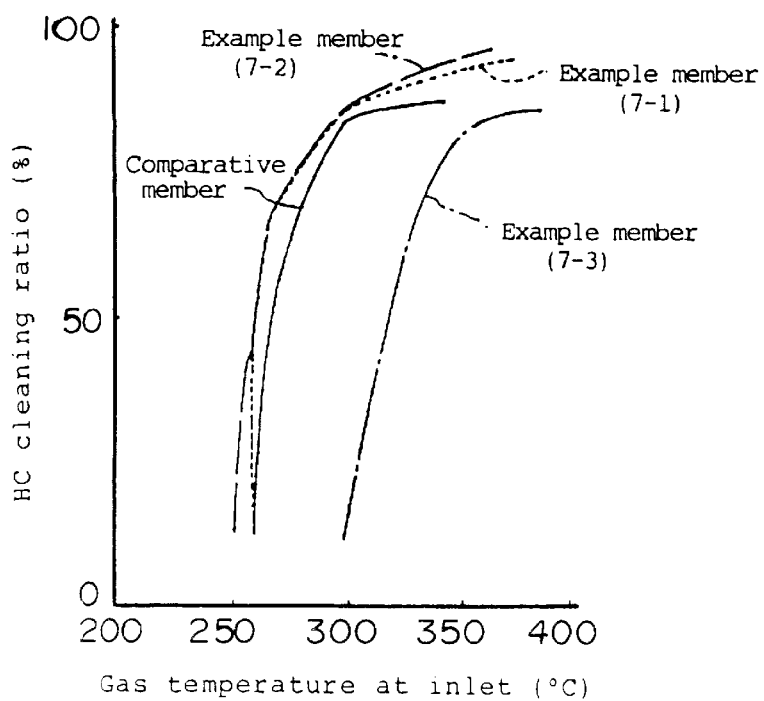
FIG. 25 is a graph which shows temperature dependencies of an HC cleaning ratio of each member of FIG. 22 after a thermal treatment.

As to the HC cleaning property, there is not so large difference between the Example members (7-1 and 7-2) and the Comparative members and the Example member 7-3 shows the less cleaning ratio at the low temperature at the fresh mode (FIG. 24). However, the Example members (7-1 and 7-2) show the higher cleaning ratio than the Comparative member after the thermal treatment (FIG. 25).

As to the CO cleaning property, with both of the fresh mode (FIG. 26) and the thermal treatment mode (FIG. 27), there is not so large difference between the Example members (7-1 and 7-2) and the Comparative members, and the Example member 7-3 shows a less cleaning ratio at the low temperature.

Estimation with Actual Automobile

The Example member (7-3, both of Pt and Ir have the oxidation numbers of four) and the Comparative member each was installed in the actual automobile and total cleaning ratios were compared at the 10–15 mode. The results are shown in Table 9.

TABLE 9

| | Example 7-3 Pt$^{+4}$, Ir$^{+4}$ | Comparative Example Pt$^{+2}$, Ir$^{+3}$ |
|---|---|---|
| NOx Cleaning Ratio | 30.6% | 23.4% |
| HC Cleaning Ratio | 95.2% | 96.3% |
| CO Cleaning Ratio | 92.5% | 92.3% |

Average Gas Temperature at Catalyst Member Inlet: 270° C.
Average Catalyst Member Inside Temperature: 300° C.

It is seen from Table 9 that there is almost no difference between the Example member 7-3 and the Comparative member in the HC cleaning ratio the CO cleaning ratio. However, the NOx cleaning ratio is much higher in the Example member 7-3 than the Comparative member. This would be because the temperature shifting effect affected advantageously.

State Change of Pt

Figure 28:
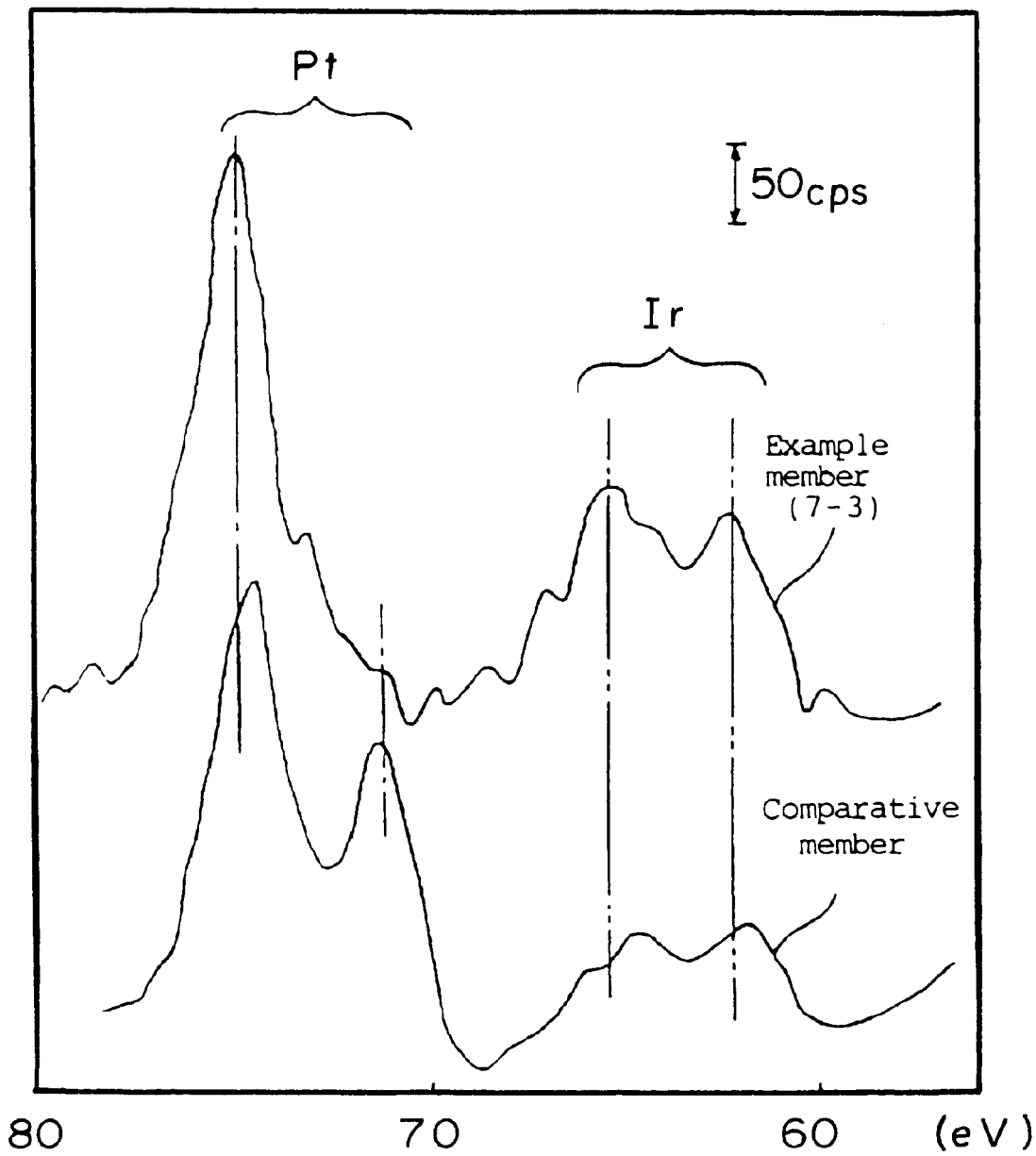
FIG. 28 is a graph which shows analysis results of Pt and Ir states with ESCA.

Using ESCA (electron spectroscopy for chemical analysis), states of Pt and Ir were observed with respect to the Example 7-3 member in which Pt and Ir were present as Pt$^{+4}$ and Ir$^{+4}$ and the Comparative member. The results are shown in FIG. 28. The state of Ir in the Example member have not been so changed when compared with the Comparative member. However, the state of Pt has been relatively changed. Thus, such a change of the Pt state seems to greatly affect the temperature shift.

What is claimed is:

1. A method for removing NO$_x$ from a gas, said method comprising:
    (a) contacting air and fuel at an air to fuel ratio of 22:1 to produce a combustible mixture,
    (b) combusting said combustible mixture to produce said gas, and
    (c) contacting said gas with a catalyst component to break down at least about 30% NOx in said gas, wherein said catalyst component comprises:
        (1) a carrier comprising a metal containing silicate which is a crystalline porous material containing at least Al as a framework forming element;
        (2) a noble metal active component carried on said carrier, said noble metal active component having catalytic activity and being selected from the group consisting of Pt, Rh and Ir; and
        (3) γ-Al$_2$O$_3$ and CeO$_2$ as co-catalyst components.

2. The method according to claim 1 wherein the metal containing silicate carries Pt and Ir as the noble active components.

3. The method according to claim 2 wherein the weight ratio of Al$_2$O$_3$/CeO$_2$ is in the range of 0.1 to 10.

4. The method according to claim 1 wherein said catalyst component is formed from a dispersion comprising a metal containing silicate and a noble metal active component.

5. The method according to claim 2 wherein the amount of the noble metal active component supported by the metal containing silicate is not more than 2 g/l-catalyst component.

6. The method according to claim 3 wherein said catalyst component is formed from a dispersion comprising a metal containing silicate and a noble metal active component.

7. The method according to claim 3 wherein the amount of the noble metal active component supported by the metal containing silicate is not more than 2 g/l-catalyst component.

8. The method according to claim 1, wherein the metal containing silicate contains Pt and Rh as the noble metal active components.

9. The method according to claim 8, wherein the weight ratio of Al$_2$O$_3$/CeO$_2$ is in the range of 0.1 to 10.

10. The method according to claim 8, wherein a noble metal active component is added to said oxides.

11. The method according to claim 8, wherein the amount of the noble metal active component supported by the metal containing silicate is not more than 2 g/l-catalyst component.

12. The method according to claim 9, wherein the oxides carry a noble metal active component.

13. The method according to claim 9, wherein the amount of the noble metal active component supported by the metal containing silicate is not more than 2 g/l-catalyst component.

14. The method according to claim 2, wherein the catalyst component comprises at least one of Ni, Mn, and Co.

15. The method according to claim 14, wherein the amount of noble metal active component supported by the metal containing silicate is not more than 2 g/l-catalyst component.

16. The method according to claim 1, wherein the total weight of $Al_2O_3$ and $CeO_2$ is in the range of 30 to 80% based on the total weight of the entire catalyst component.

17. The method according to claim 8, wherein the total weight of $Al_2O_3$ and $CeO_2$ is in the range of 30 to 80% based on the total weight of the silicate, and $Al_2O_3$ and $CeO_2$.

18. The method according to claim 2, wherein the total weight of $Al_2O_3$ and $CeO_2$ is in the range of 30 to 80% based on the total weight of the silicate, $Al_2O_3$ and $CeO_2$.

19. The method according to claim 2 wherein the total weight of $Al_2O_3$ and $CeO_2$ is in the range of 40 to 60% based on the total weight of the silicate, $Al_2O_3$ and $CeO_2$.

20. The method according to claim 8, wherein the total weight of $Al_2O_3$ and $CeO_2$ is in the range of 40 to 60% based on the total weight of the silicate, $Al_2O_3$ and $CeO_2$.

21. A method for removing $NO_x$ from a gas according to claim 1,
wherein the total weight of said $\gamma$-$Al_2O_3$ and $CeO_2$ co-catalyst components is in the range of 30 to 80% by weight based on the total weight of the silicate, said $\gamma$-$Al_2O_3$ and said $CeO_2$ and having a weight ratio of $Al_2O_3/CeO_2$ in the range of 0.5 to 4.

22. A method for removing $NO_x$ from a gas according to claim 1,
wherein the total weight of said $\gamma$-$Al_2O_3$ and $CeO_2$ co-catalyst components is in the range of 40 to 60% by weight based on the total weight of the silicate, said $\gamma$-$Al_2O_3$ and said $CeO_2$ and having a weight ratio of $Al_2O_3/CeO_2$ in the range of 1 to 7/3.

23. The method according to claim 1, wherein said method produces a higher temperature at which maximum NOx removal is obtained compared to another temperature at which maximum NOx removal is obtained by another method for removing $NO_x$ from said gas, said another method comprising:
(a) contacting air and fuel at said air to fuel ratio of 22:1 to produce said combustible mixture,
(b) combusting said combustible mixture to produce said gas, and
(c) contacting said gas with said another catalyst, wherein said another catalyst comprises:
(1) said carrier;
(2) said noble metal active component; and
(3) $CeO_2$ and no $\gamma$-$Al_2O_3$.

24. The method according to claim 1, wherein the support is in the form of a honeycomb, and the honeycomb is coated with the catalyst component.

25. The method according to claim 2, wherein a weight ratio of $Al_2O_3/CeO_2$ is in the range of 0.5 to 4.

26. The method according to claim 8, wherein a weight ratio of $Al_2O_3/CeO_2$ is in the range of 0.5 to 4.

27. The method according to claim 2, wherein a weight ratio of $Al_2O_3/CeO_2$ is in the range of 1 to 7/3.

28. The method according to claim 8, wherein a weight ratio of $Al_2O_3/CeO_2$ is in the range of 1 to 7/3.

29. The method according to claim 25 wherein the total weight of $Al_2O_3$ and $CeO_2$ is in the range of 40 to 60% based on the total weight of the silicate, $Al_2O_3$ and $CeO_2$.

30. The method according to claim 26, wherein the total weight of $Al_2O_3$ and $CeO_2$ is in the range of 40 to 60% based on the total weight of the silicate, $Al_2O_3$ and $CeO_2$.

31. The method according to claim 27, wherein the total weight of $Al_2O_3$ and $CeO_2$ is in the range of 40 to 60% based on the total weight of the silicate, $Al_2O_3$ and $CeO_2$.

32. The method according to claim 28, wherein the total weight of $Al_2O_3$ and $CeO_2$ is in the range of 40 to 60% based on the total weight of the silicate, $Al_2O_3$ and $CeO_2$.

33. The method according to claim 25, wherein the total weight of $Al_2O_3$ and $CeO_2$ is in the range of 30 to 80% based on the total weight of the silicate, $Al_2O_3$ and $CeO_2$.

34. The method according to claim 26, wherein the total weight of $Al_2O_3$ and $CeO_2$ is in the range of 30 to 80% based on the total weight of the silicate, $Al_2O_3$ and $CeO_2$.

35. The method according to claim 27, wherein the total weight of $Al_2O_3$ and $CeO_2$ is in the range of 30 to 80% based on the total weight of the silicate, $Al_2O_3$ and $CeO_2$.

36. The method according to claim 28, wherein the total weight of $Al_2O_3$ and $CeO_2$ is in the range of 30 to 80% based on the total weight of the silicate, $Al_2O_3$ and $CeO_2$.

37. A method for removing $NO_x$ from a gas, said method comprising:
(a) contacting air and fuel at a lean air to fuel ratio of 22:1 to produce a combustible mixture,
(b) combusting said combustible mixture to produce said gas, and
(c) contacting said gas with a catalyst component to break down at least about 30% NOx in said gas, wherein said catalyst component comprises:
(1) a carrier comprising a metal containing silicate which is a crystalline porous material containing at least Al as a framework forming element;
(2) a noble metal active component carried on said carrier, said noble metal active component having catalytic activity and being selected from the group consisting of Pt, Rh and Ir; and
(3) $\gamma$-$Al_2O_3$ and $CeO_2$ as co-catalyst components to shift the maximum active temperature to a higher temperature by increasing air to fuel ratio.

38. A method for removing $NO_x$ from a gas according to claim 37, wherein the total weight of said $\gamma$-$Al_2O_3$ and $CeO_2$ co-catalyst components being in the range of 30 to 80% by weight based on the total weight of the silicate, said $\gamma$-$Al_2O_3$ and said $CeO_2$ and having a weight ratio of $Al_2O_3/CeO_2$ in the range of 0.5 to 4.

39. A method for removing $NO_x$ from a gas according to claim 37, wherein the total weight of said $\gamma$-$Al_2O_3$ and $CeO_2$ co-catalyst components being in the range of 40 to 60% by weight based on the total weight of the silicate, said $\gamma$-$Al_2O_3$ and said $CeO_2$ and having a weight ratio of $Al_2O_3/CeO_2$ in the range of 1 to 7/3.

40. The method according to claim 1 or 37, wherein said catalyst component is coated on a support member.

* * * * *